US012633277B2

(12) United States Patent
Aviv et al.

(10) Patent No.: US 12,633,277 B2
(45) Date of Patent: May 19, 2026

(54) DYNAMIC PEDAL AND DISPLAY

(71) Applicant: Prophet Productions, LLC, New York, NY (US)

(72) Inventors: Bobby Elijah Aviv, New York, NY (US); Amy L Pearson, Glenview, IL (US)

(73) Assignee: Prophet Productions, LLC, New York, NY (US)

( * ) Notice: Subject to any disclaimer, the term of this patent is extended or adjusted under 35 U.S.C. 154(b) by 921 days.

(21) Appl. No.: 17/866,562

(22) Filed: Jul. 18, 2022

(65) Prior Publication Data

US 2023/0032698 A1 Feb. 2, 2023

Related U.S. Application Data

(60) Provisional application No. 63/226,179, filed on Jul. 28, 2021.

(51) Int. Cl.
*G10H 1/00* (2006.01)

(52) U.S. Cl.
CPC ......... *G10H 1/0058* (2013.01); *G10H 1/0091* (2013.01); *G10H 2210/281* (2013.01);
(Continued)

(58) Field of Classification Search
CPC ............... G10H 1/0058; G10H 1/0091; G10H 2210/281; G10H 2210/311; G10H 2220/096; G10H 2220/265
(Continued)

(56) References Cited

U.S. PATENT DOCUMENTS 5,105,711 A * 4/1992 Barnard ................... G10H 3/18 84/742
5,166,467 A * 11/1992 Brown ................... G10H 1/348 84/715
(Continued)

FOREIGN PATENT DOCUMENTS

AU 2013270633 A1 * 12/2014 ............. G10H 1/348
DE 3621172 A1 * 1/1988 ............. G10H 1/348
(Continued)

OTHER PUBLICATIONS

CarterLily iPhone 7 Plus Case, iphone 8 Plus Case, Full Body Shockproof Dustproof Waterproof Aluminum Alloy Metal Gorilla Glass Cover Case for Apple iPhone 7 8 Plus 5.5 inch—Black; Available at https://www.amazon.sg/CarterLily-Shockproof-Dustproof-Waterproof-Aluminum/dp/B01M35XH1E.
(Continued)

*Primary Examiner* — Christina M Schreiber
(74) *Attorney, Agent, or Firm* — Jason H. Vick; Amped IP LLC

(57) ABSTRACT

A small (smartphone-sized or tablet-sized), foot-enabled, flat, tiltable, rotatable, dynamic touch screen pedal and controller that uses a tilt mechanism to toggle between and select different audio (or other) functions and effects that are displayed on the attached display. The tilt of the device as well as optional tapping sequences activate different functions in predetermined function locations. Specific audio effects, audio effect presets, loops, songs, and controller functions can each be assigned to different touch screen locations, pedal buttons, and/or tilt directions.

26 Claims, 29 Drawing Sheets

(52) U.S. Cl.
CPC . *G10H 2210/311* (2013.01); *G10H 2220/096* (2013.01); *G10H 2220/265* (2013.01)

(58) Field of Classification Search
USPC .......................................................... 84/600
See application file for complete search history.

(56) References Cited

U.S. PATENT DOCUMENTS

| | | | | |
|---|---|---|---|---|
| 5,245,128 | A | 9/1993 | Araiza | |
| 5,810,703 | A * | 9/1998 | Stack | A63B 22/18 482/79 |
| 5,883,615 | A * | 3/1999 | Fago | H01H 3/14 307/119 |
| 6,689,947 | B2 * | 2/2004 | Ludwig | G10H 3/26 84/645 |
| 7,356,433 | B2 | 4/2008 | Tsai | |
| 7,541,536 | B2 | 6/2009 | Shavit | |
| 8,063,294 | B1 | 11/2011 | Amberg | |
| 8,338,689 | B1 * | 12/2012 | Beaty | G10H 1/348 84/718 |
| 8,654,074 | B1 * | 2/2014 | Auguste | A61F 4/00 345/156 |
| 8,816,182 | B2 | 8/2014 | Robertson | |
| 8,865,992 | B2 | 10/2014 | Shavit | |
| 9,522,324 | B2 * | 12/2016 | Levasseur | G06F 3/0334 |
| 9,548,044 | B2 | 1/2017 | Chekardzhikov | |
| 9,812,106 | B1 * | 11/2017 | Miller | G10H 1/02 |
| 11,076,213 | B2 * | 7/2021 | Aviv | G10H 3/186 |
| 11,290,797 | B2 * | 3/2022 | Aviv | G10H 3/186 |
| 2006/0011052 | A1 * | 1/2006 | Purchon | G10H 1/348 84/746 |
| 2007/0003073 | A1 | 1/2007 | Iriarte | |
| 2007/0131100 | A1 | 6/2007 | Daniel | |
| 2008/0060507 | A1 * | 3/2008 | Welchering | G10H 1/0016 84/645 |
| 2008/0229914 | A1 * | 9/2008 | Nathanial | G10H 1/348 84/644 |
| 2011/0271820 | A1 * | 11/2011 | Cockerell | G10H 1/348 84/746 |
| 2013/0291708 | A1 * | 11/2013 | Orshan | G10H 1/0091 84/626 |
| 2013/0298752 | A1 * | 11/2013 | Juszkiewicz | G10H 1/34 84/746 |
| 2013/0327201 | A1 * | 12/2013 | Urry | G10H 1/348 84/626 |
| 2014/0035888 | A1 * | 2/2014 | Levasseur | A63F 13/214 345/184 |
| 2014/0216233 | A1 * | 8/2014 | Zhonggang | G10G 1/00 84/486 |
| 2014/0276143 | A1 | 9/2014 | Corl | |
| 2015/0139440 | A1 | 5/2015 | Crawford | |
| 2015/0176890 | A1 | 6/2015 | Spanos | |
| 2016/0225356 | A1 * | 8/2016 | D'Addario | G10G 7/02 |
| 2017/0028870 | A1 * | 2/2017 | Nachtmann | H02N 15/02 |
| 2017/0316766 | A1 * | 11/2017 | Perez | G10H 1/18 |
| 2018/0197512 | A1 * | 7/2018 | Perez | G10H 1/348 |
| 2020/0372880 | A1 * | 11/2020 | Stanley | G10G 7/00 |
| 2020/0372885 | A1 * | 11/2020 | Burrer | G10H 1/0058 |
| 2021/0152908 | A1 * | 5/2021 | Aviv | G10H 1/0091 |
| 2023/0022204 | A1 * | 1/2023 | Aviv | G10H 1/0091 |
| 2023/0032698 | A1 * | 2/2023 | Aviv | G10H 1/348 |
| 2023/0230566 | A1 * | 7/2023 | Ogonowsky | H03G 3/02 84/746 |
| 2025/0071457 | A1 * | 2/2025 | Aviv | H04R 1/22 |

FOREIGN PATENT DOCUMENTS

| | | | | |
|---|---|---|---|---|
| EP | 3171480 | B1 | 7/2020 | |
| JP | 2018180065 | A * | 11/2018 | |
| WO | WO-2012139188 | A1 * | 10/2012 | G10H 3/187 |
| WO | WO-2022046008 | A1 * | 3/2022 | G05G 1/30 |

OTHER PUBLICATIONS

Gil "GTC Sound Innovations Revpad wireless guitar multi-fx demo" YouTube Video Available at https://www.youtube.com/watch?v=vHTpXfYsjVg; date unkown.
Laroche, Jean "Estimating Tempo, Swing and Beat Locations in Audio Recordings" Proceedings of the 2001 IEEE Workshop on the Applications of Signal Processing to Audio and Acoustics (Cat. No. 01TH8575), New Platz, NY, USA, 2001, pp. 135-138.
Otterbox Defender Series iPhone 13 Pro Case; Available at https://www.otterbox.com/en-us/protective-iphone-13-pro-case-black/77-83422.html; Date Unknown.
Stark, A.M. et al. "Real-Time Beat-Synchronous Audio Effects" Proceedings of the 2007 Conference on New Interfaces for Musical Expression (NIME07), New York, NY, USA; Jun. 6, 2007.
Thorn, Pete "REVPAD Incredible sounding guitar FX w/Touchpad demo by Pete Thorn" YouTube Video Available at https://www.youtube.com/watch?v=TLPnZwdYF10; date unknown.
International Search Report for Corresponding PCT Application No. PCT/US2019/044257, mailed Oct. 17, 2019.
Written Opinion for Corresponding PCT Application No. PCT/US2019/044257, mailed Oct. 17, 2019.
Office Action for corresponding U.S. Appl. No. 17/152,702, mailed Mar. 24, 2021.
Office Action for corresponding U.S. Appl. No. 17/354,893, mailed Oct. 20, 2021.
Office Action for corresponding U.S. Appl. No. 17/354,893, mailed Dec. 16, 2021.

* cited by examiner

FIG. 6c
CHECK
LEVEL
TONE
DIST
Distortion
DS-1
BOSS

DYNAMIC PEDAL AND DISPLAY

CROSS-REFERENCE TO RELATED APPLICATIONS

The present application claims the benefit of and priority, under 35 U.S.C. § 119(e), to U.S. Provisional Application Ser. No. 63/226,179, filed on Jul. 28, 2021, entitled "DYNAMIC PEDAL AND DISPLAY," the entire disclosure of which is hereby incorporated herein by reference, in its entirety, for all that it teaches and for all purposes.

BACKGROUND OF THE INVENTION

Most audio effect pedals manufactured to date have followed a very similar design over the last 50-60 years—a hard plastic or metal enclosure, a few audio effect parameter knobs/sliders/switches, and one or more stomp/foot switches. Standard audio effect pedals typically have one static audio effect which can't be replaced, but can be modified, for example, with the parameter knobs/sliders/switches.

FIG. 1 shows how musicians often use multiple pedals/stompboxes (three pedal/stompboxes shown) 103 to add audio effects to the audio signal from an instrument 101 or microphone (not shown) connected via an audio cable 102 such as a TS/TRS/instrument/speaker cable, an XLR cable, or other cable that can carry an audio signal. The processed audio signal is then sent to an output device such as an amplifier 106, PA system 105, or recording device (not shown) via a second audio cable 104.

Recent innovations allow a guitar pedal's 103 audio effect algorithms to be updated via a Bluetooth connection 107 between the pedal 103 and an app(lication) on a smartphone 108. An example of this type of audio effects pedal is the Hotone XTOMP Bluetooth Modeling Effects Pedal. Audio effect parameter changes are made via knobs on the pedal. Further, sending the audio effect algorithm to the pedal can take several minutes. The Hotone XTOMP Bluetooth Modeling Effects Pedal has six rotary knobs for adjusting parameters and an activation switch, however, the location and functionality of the knobs and buttons are static. The musician must remember the functionality of each of the six knobs for each separate audio effect as well as each separate audio effect parameter. Further, if an audio effect uses more than 6 knobs or switches (such as the Strymon Iridium Amp Pedal), the XTOMP pedal won't be able to fully emulate those particular audio effect pedals. The Hotone XTOMP Bluetooth Modeling Effects Pedal also requires an external power source.

Historically, multi-effect pedals/stompboxes have large housings with numerous rotary knobs such as the Boss ME-80 (30 knobs, 4 buttons, and 8 switches), the HeadRush Pedalboard (having 12 switches, a touch screen interface with 3 knobs, and 4 additional knobs), and the Empress Effects Multidrive Effects Pedal (having 10 knobs, 5 switches, and 2 buttons). These pedals are static—they use a fixed amount of audio effects that ship with the unit and all of the buttons, switches, knobs, and sliders are in fixed locations on the pedals.

In 2018, IK Multimedia released the iRig Stomp I/O. As shown in FIG. 2, the iRig Stomp I/O is a pedal board with four onboard switches and an expression pedal. The iRig Stomp I/O connects to a user's computer or smart device such as an Apple iPad or iPhone using IK Multimedia's Amplitube software to graphically create an audio effects chain out of representations of different stomp boxes. The iRig Stomp I/O uses the musician's iPad or iPhone as the pedalboard's graphical interface and audio effects processor. Presets are assigned to one of the 4 switches which are horizontally lined up and spaced apart. The musician's iPad rests on the face of the large pedal board with no protection. While IK Multimedia's Amplitube graphics are eye-pleasing, iPads/tablets at floor level are susceptible to damage from liquid or getting stepped on or knocked over. Additionally, the musician needs to kneel down during a sound check or performance to adjust parameter settings. Further, multiple cables as well as a power cord is necessary.

Commonly-owned, U.S. Pat. No. 11,076,213, entitled "Intelligent Cable Digital Signal Processing System and Method" (hereinafter referred to as the "iCable Patent") which is incorporated herein by reference in its entirety discloses an iCable—a specialized audio/instrument cable with built-in digital signal processing capabilities that adds user-defined audio effects (such as reverb, delay, chorus and/or distortion) from within the cable itself to affect the sound generated from an instrument or microphone such that the cable is the only connection needed between the instrument or microphone and an output device (such as an amplifier, PA, powered speaker, music mixer, or a recording device). The audio effects and/or audio effects parameters used by the iCable can be changed via (i) an app from a smartphone, tablet, computer or other electronic device; (ii) a wireless controller; (iii) a wireless pedal, and/or (iv) any other type of wireless controller that has the ability to communicate with a smartphone/tablet/computer or other electronic device. The iCable can also be used as either a looper/discreet multi-track recording unit as well as a background track playback device. The iCable app allows multiple audio loops/overdubs to be recorded and played within the iCable while the musician's audio (e.g., guitar) signal is simultaneously processed within the iCable using audio effects. The iCable app can also wirelessly send to the iCable pre-recorded songs or audio selections to play alongside the audio signal processed by the iCable.

Because the iCable has all of the audio effects capabilities built into it, all the musician needs to bring to a performance or recording is the iCable, their instrument, and their smartphone. Optionally, the musician may also use other "iCable-enabled" wireless controllers such as the iPedal and/or the iClip as disclosed in the iCable Patent. The iPedal is a small wireless foot pedal/switch allowing the musician a familiar location and process to switch between the audio effect presets by tapping on little foot switches. The iClip is a small wireless device placed on the guitar headstock with an optional tuner incorporated into it that allows the musician to toggle between audio effect presets by tapping small buttons.

In doing away with multiple stompboxes/pedals and corresponding audio cables, as well as housing the audio processing technology within the audio cable itself, the iCable represents a new paradigm in live musical performance and recording: no extra cables, no extra pedals, and no extra power sources. Significantly, the iCable also levels the playing field within the music-making ecosystem by allowing musicians without a lot of disposable income to compete with those musicians who can afford to purchase numerous foot pedals/stompboxes and corresponding audio cables. For example, it is not uncommon for a typical guitarist or bassist to carry to performances 5-10 pedals/stompboxes and associated cables (to connect the pedals) as well as corresponding batteries or power supply units. Instead of needing to buy additional audio effects pedals, the iCable app can allow the musician to simply download additional audio effects she chooses to use directly into her iCable.

While the iCable enables the musician to significantly reduce the amount of equipment needed for performances, the musician is, at least at present, more familiar and likely comfortable with using pedals than changing presets through an app on a phone during live performances. Using multiple wireless pedals, even if there are less cables, still adds significant cost/weight/labor. It also isn't convenient to use one iPedal (as disclosed in the iCable Patent as discussed above) to control multiple effects/loops/songs. What is needed is a smaller, convenient, and efficient single-housed multi-effect stompbox.

BRIEF SUMMARY OF THE INVENTION

The iTap Pedal is a small (smartphone-sized or tablet-sized), foot-enabled, flat, tiltable, rotatable, dynamic touch screen pedal and controller that uses a tilt mechanism, in various embodiments, to toggle between and select different audio (or other) functions and effects that are displayed on the attached display.

The tilt of the device as well as optional tapping sequences activate different functions in predetermined function locations. Specific audio effects, audio effect presets, loops, songs, and controller functions can each be assigned to different touch screen locations, pedal buttons, and/or tilt directions. The display dynamically changes to represent various functions—different audio effects, audio effect presets, looper capability (recording/playback), songs, and other controller functions.

The iTap Pedal has a customizable graphical user interface that allows the user to change graphics, text, control types (knob/slider), control locations, the orientation of the display (landscape or portrait), colors, and sizes of anything on the display.

The iTap Pedal can control functions and manipulate audio effects that are: stored in a separate device such as the iCable (as disclosed in the iCable Patent as discussed above), within the iTap Pedal itself, or within another electronic device such as a laptop or iPad running Apple's Logic Pro or Apple's GarageBand software.

By using an updatable dynamic touch screen interface for foot pedal effects and controls, the user is presented with almost limitless possibilities of desired audio effects, controller functions, and button positioning to choose from and engage with.

In an alternate embodiment, the user can convert their own smartphone/tablet into an iTap Pedal by using a ruggedized iTap Pedal Case. Smartphones/tablets have tilt sensors preinstalled. Therefore, an iTap Pedal App on a smartphone/tablet (which is housed in an iTap Pedal Case) can register tilt and act as an economical iTap Pedal.

BRIEF DESCRIPTION OF THE DRAWINGS

Illustrated in the accompanying drawing(s) are embodiments of the present invention in such drawings.

The above-described figures illustrate the described apparatus and its method of use in several preferred embodiments, which are further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

DETAILED DESCRIPTION OF THE INVENTION

Tiltable Touch Screen iTap Pedal

Figure 1:
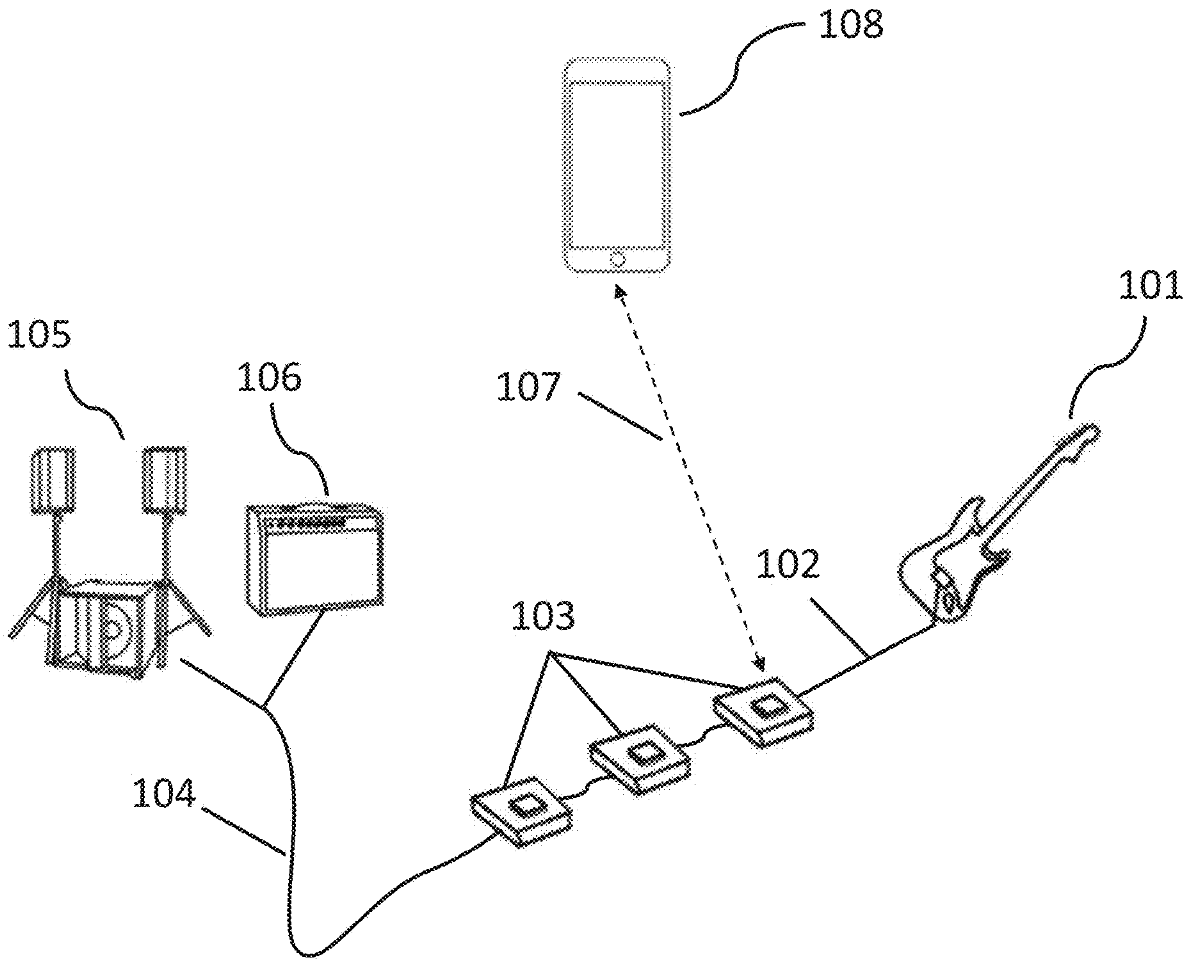
(PRIOR ART) FIG. 1
FIG. 1 is a diagram showing the prior art setup for guitarist's performance including three pedals/stompboxes.
Figure 2:
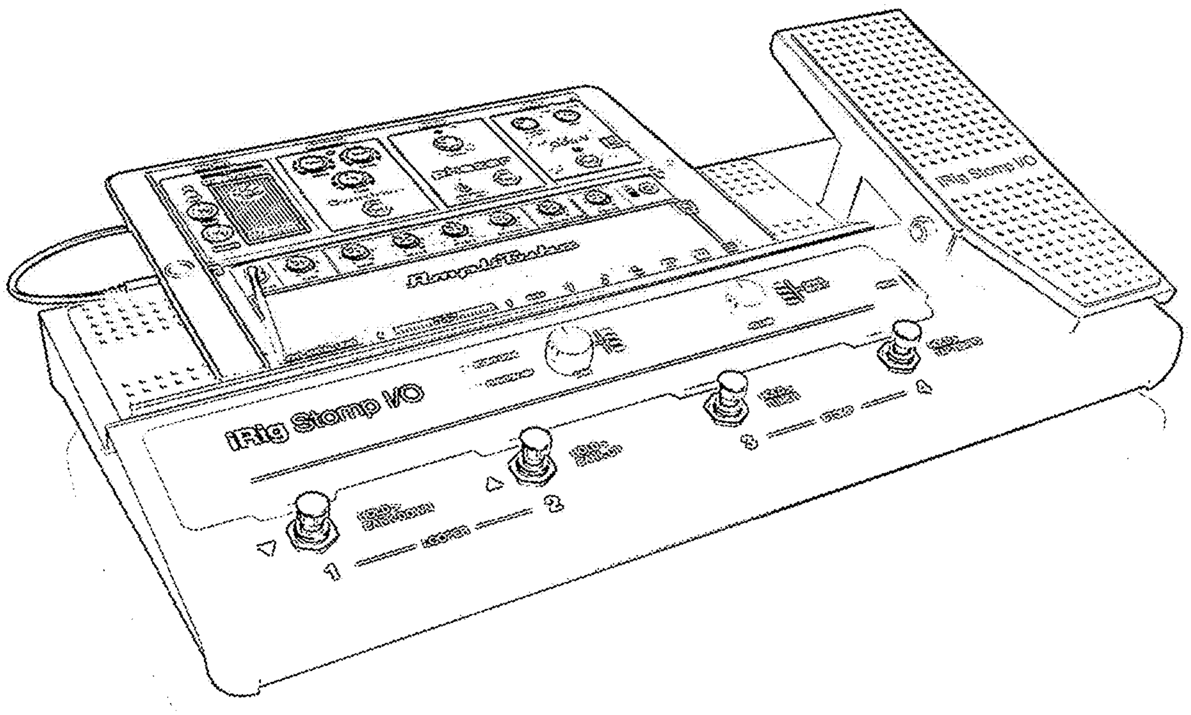
(PRIOR ART) FIG. 2
FIG. 2 shows the prior art IK Multimedia iRig Stomp I/O.
Figure 3A:
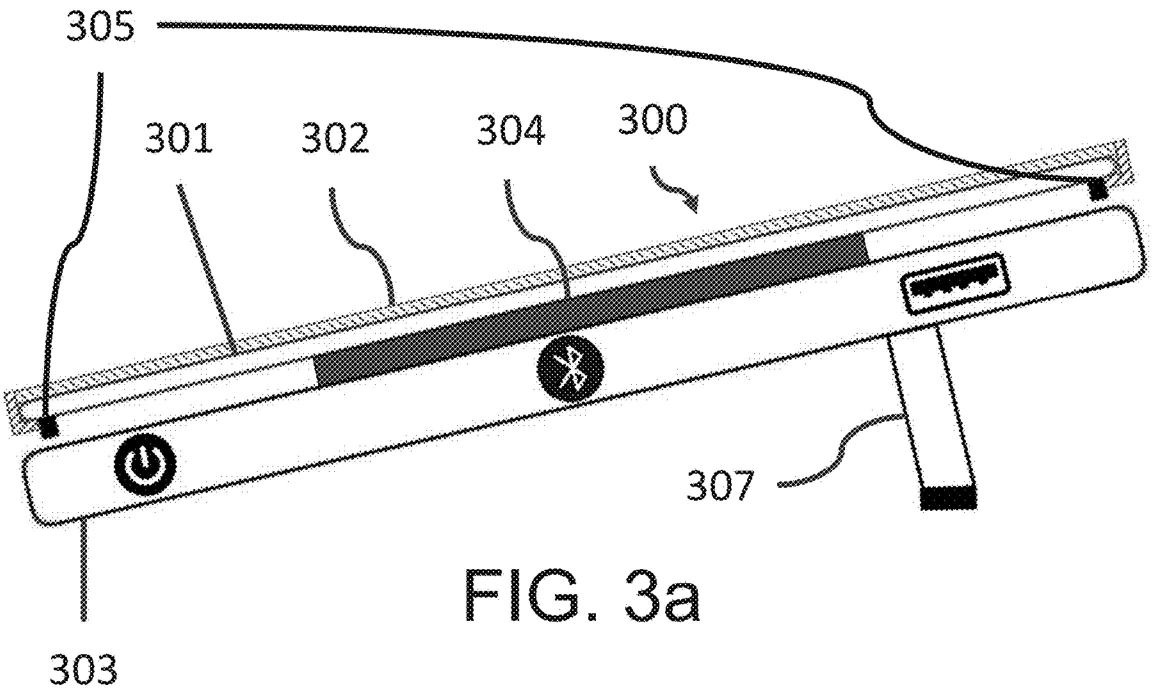
FIG. 3*a* shows the side view of a wireless iTap Pedal.
Figure 3B:
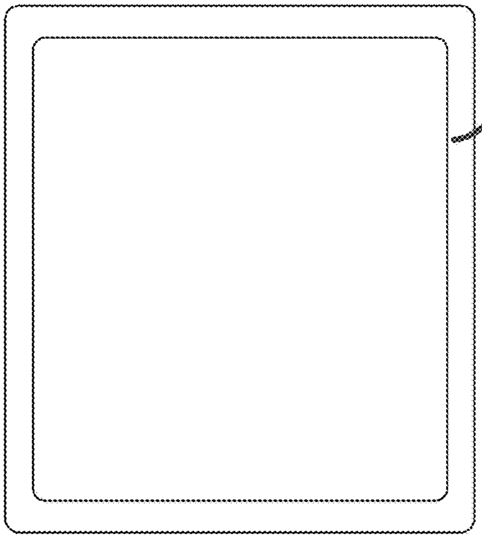
FIG. 3*b* shows a top view of a wireless iTap Pedal.
Figure 4A:
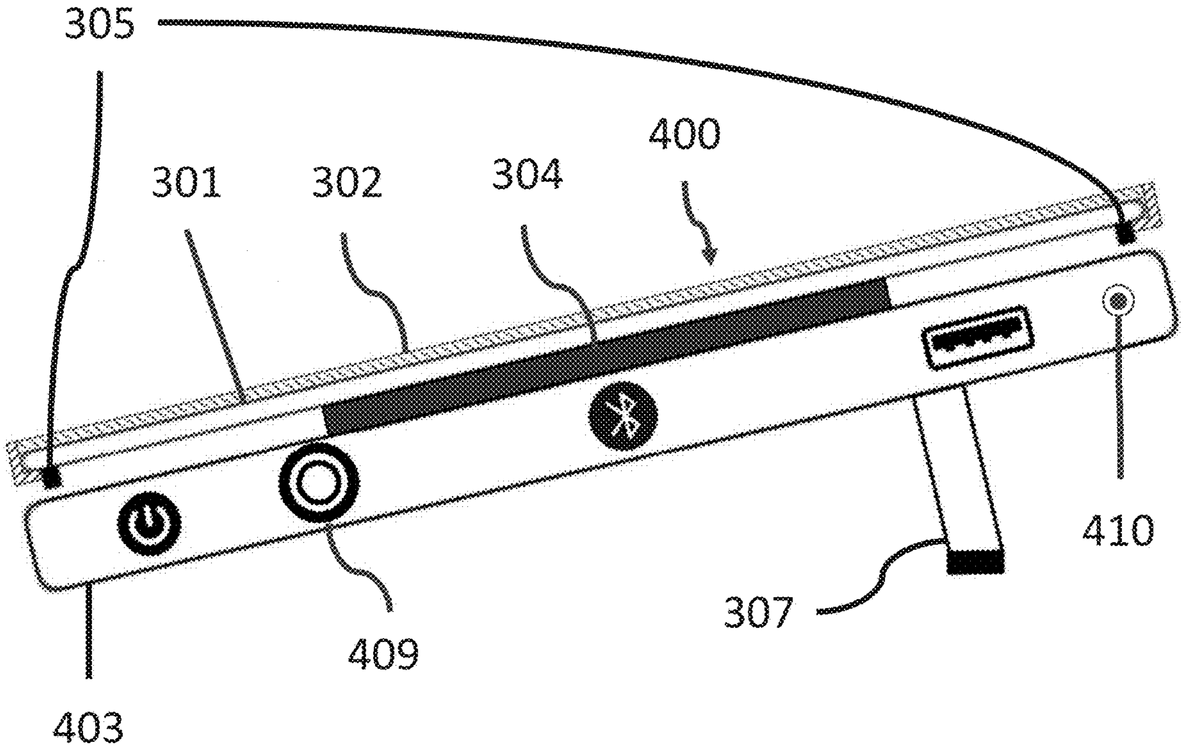
FIG. 4*a* shows the side view of a cable-ready iTap Pedal with digital signal processing.

As shown in FIG. 3*a* and FIG. 4*a*, the preferred embodiment of the iTap Pedal is a small (smartphone-sized or tablet-sized), foot-enabled, flat, tiltable, rotatable, dynamic touch screen pedal and controller that can be used: (i) to toggle between audio effects and/or audio effect presets; (ii) as a looper pedal; (iii) as a song playback pedal; (iv) as a MIDI controller such as the Allen & Heath Xone:K2 or the Positive Grid BIAS-4 Bluetooth Midi Footswitch; (v) as a wireless controller; and/or (vi) as a combination of all of these devices.

Figure 5A:
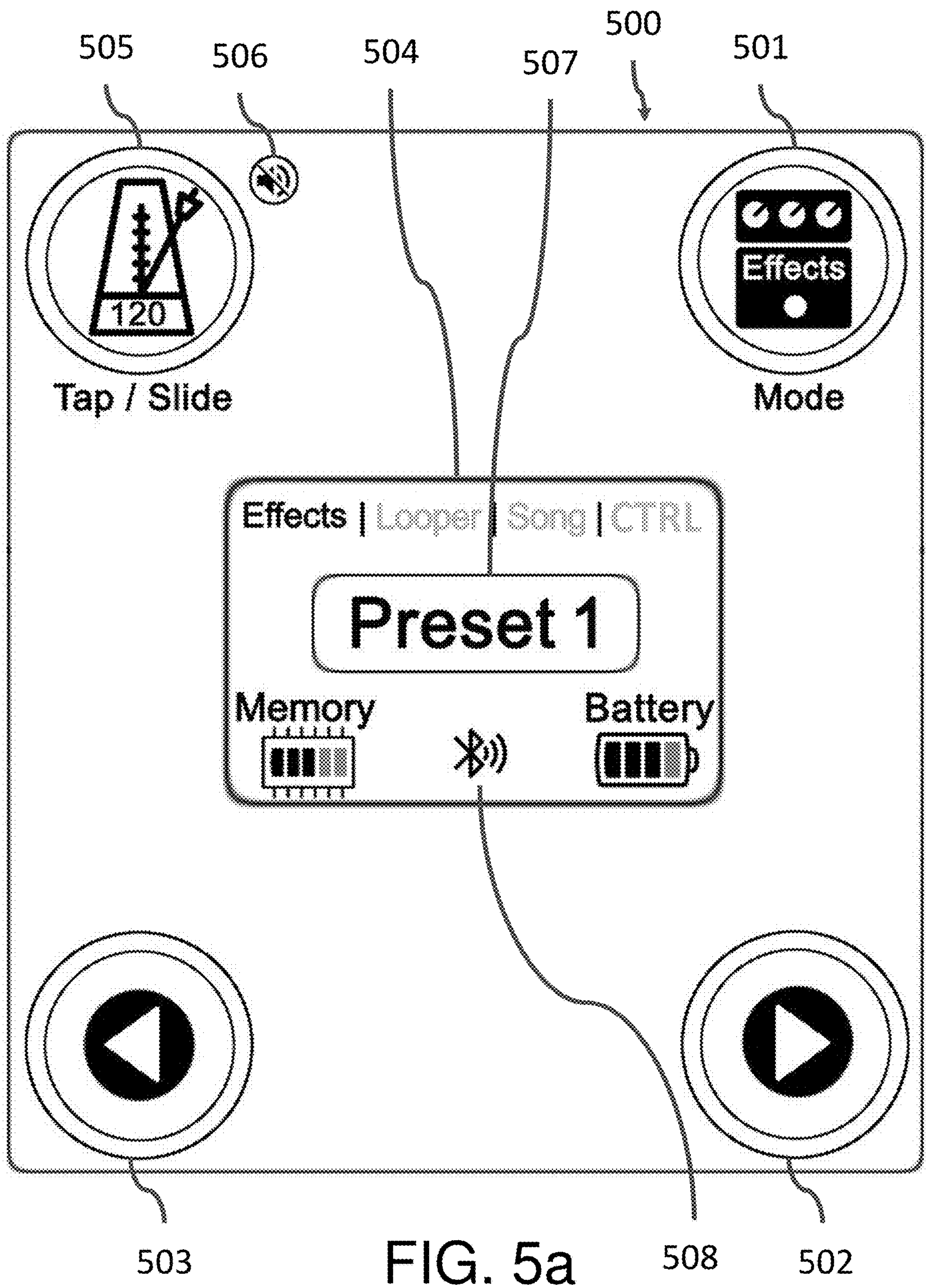
FIG. 5*a* shows the Audio Effects Mode graphical user interface.

FIG. 3*a* shows an iTap Pedal 300 as a wireless controller for controlling an external audio device such as (i) an iCable (as disclosed in the iCable Patent as discussed above) which stores and processes audio effects, and records, stores, and plays back loops and songs; (ii) a laptop running an audio program such as Apple's Logic Pro; or (iii) an iPad/tablet/smartphone running a music app such as Apple's GarageBand. The user first connects via Bluetooth (or other wireless connection means) to the digital signal processing device (iCable, laptop with Logic Pro, or iPad/tablet/smartphone with GarageBand). As shown in FIG. 5*a*, a successful connection is displayed as a lit Bluetooth icon 508 on the iTap Pedal.

Figure 4B:
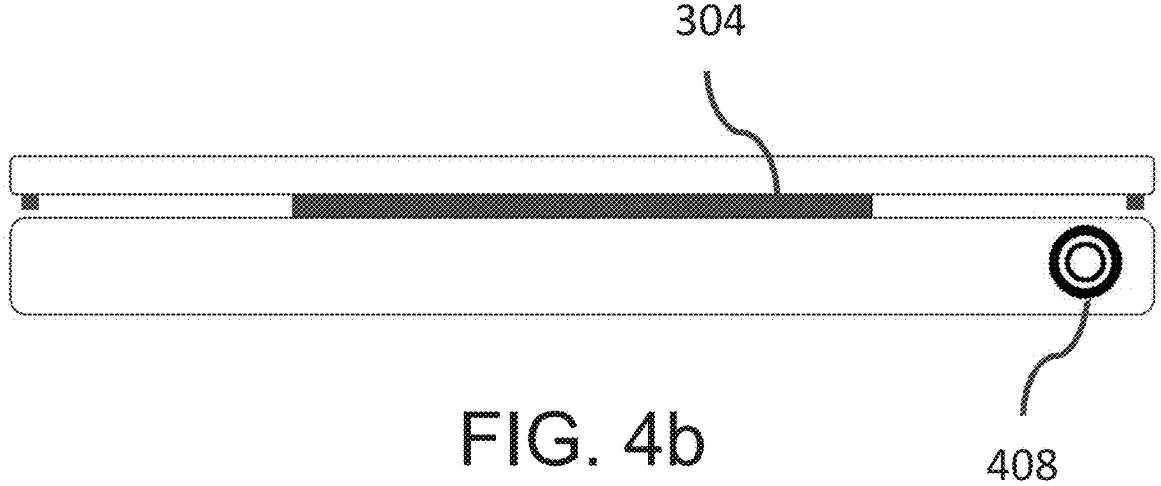
FIG. 4*b* shows a back view of a cable-ready iTap Pedal with digital signal processing.

FIG. 4*a* and FIG. 4*b* show an iTap Pedal 400 as an intelligent pedal that incorporates the functionality of the iCable (as disclosed in the iCable Patent as discussed above) into the iTap Pedal 400 such that it can also: (i) store audio effect algorithms; (ii) manipulate audio effect chains; (iii) adjust audio effect algorithms/parameters/presets; (iv) record and playback loops; and (v) store and playback songs. Thus, the iTap Pedal 400 adds digital signal processing capabilities (not shown), a microprocessor (not shown), memory (not shown), an optional battery (not shown), an XLR/¼" combo input jack 408, an XLR/¼" combo output jack 409, and an AC power input 410 to the hardware shown.

In another embodiment, the iTap Pedal shown FIG. 4*a* and FIG. 4*b* can be modified to remove the cable jacks and add a wireless receiver to receive the audio signal from an instrument and a wireless transmitter to transmit the processed signal to an output device such as an amplifier with a wireless receiver.

Touch Screen

As shown in FIG. 3*a*, FIG. 3*b*, FIG. 4*a*, and FIG. 4*b*, the touch screen 301/494 is preferably an OLED screen due to the OLED's brightness and low-power capabilities. An example of an OLED touch screen is the DFRobot 5.5" FHD AMOLED-Display Module with Capacitive Touch Screen. A capacitive touch screen is preferred for its durability. A larger screen would help the musician to be able to see the screen while standing and allow for graphically mimicking larger or multiple pedals. A larger screen would also enable the ability of the foot-activated iTap Pedal to handle the eight function locations (discussed below). If the screen/device is too small a foot tap on a corner may also register a middle tap location.

Due to the OLED screen's susceptibility to burn-in (as well as to save battery life), it may be necessary to implement screen-saving measures. A diffuse-mode proximity sensor such as the SMAKN® Infrared IR Obstacle Avoidance Detector can be used to determine when there is activity near the pedal and, only then, turn on the screen (and remain off when there is no activity near the pedal). A diffuse-mode proximity sensor uses an infrared LED to emit a beam of light and light detector to detect the amount of light bounced back. An ambient light sensor such as the Texas Instruments OPT3002 Light-to-Digital Sensor can be used to measure the amount of light in the room and adjust the screen's brightness accordingly. A feature such as Screen Shift (on LG OLED TVs) or Pixel Shift (on Sony OLED TVs) can be used to move the image slightly around the screen thus preventing burn-in of individual pixels. Built-in customized screensavers can also pop up after an extended idle time.

In an alternative embodiment, a mini LED touch screen such as the Liquid Retina XDR used on the iPad Pro may be used. In an alternative embodiment, a TFT capacitive touch screen such as the GeeekPi 5 Inch Capacitive touch screen 800×480 HDMI Monitor TFT LCD Display may also be used. Although a TFT screen has higher power requirements, it is not susceptible to screen burn-in.

Protective Cover

As shown in FIG. 3*a* and FIG. 4*a*, a transparent protective cover 302 is positioned above the display portion of the touch screen 301. The protective cover 302 can be made of any suitable material that permits the user to interact with the touch screen 301 through the protective cover 302. In one example, the protective cover 302 can be made from a thin layer of thermoplastic polycarbonate (e.g. LEXAN), polyvinyl chloride, high-strength alkali-aluminosilicate thin sheet glass (e.g. GORILLA GLASS), urethane, silicon, polyethylene terephthalate (PET), or any other suitable material. The protective cover 302 can be formed using any suitable manufacturing process, such as thermoforming, casting, stretching, heating, or injection molding. In one example, the protective cover 302 can include a thin, transparent, flexible layer of polyurethane, which can serve as a clear screen protector with desirable optical qualities (e.g. high transparency and low reflectivity). The protective cover 302 can have any suitable thickness. By way of example, the protective cover 302 can have a thickness of about 0.001-0.100, 0.001-0.050, 0.004-0.020, 0.005-0.015, or 0.005-0.010 inches. The protective cover surface can also be used to reduce glare. The protective cover 302 can include an oleophobic surface 302 which can have a micro-textured coating on its outer surface to minimize the appearance of fingerprints or oily smudges on the membrane, thereby allowing the screen of the electronic device to be clearly viewed through the membrane without unwanted obstructions.

iTap Pedal Graphical User Interface

Figure 8:
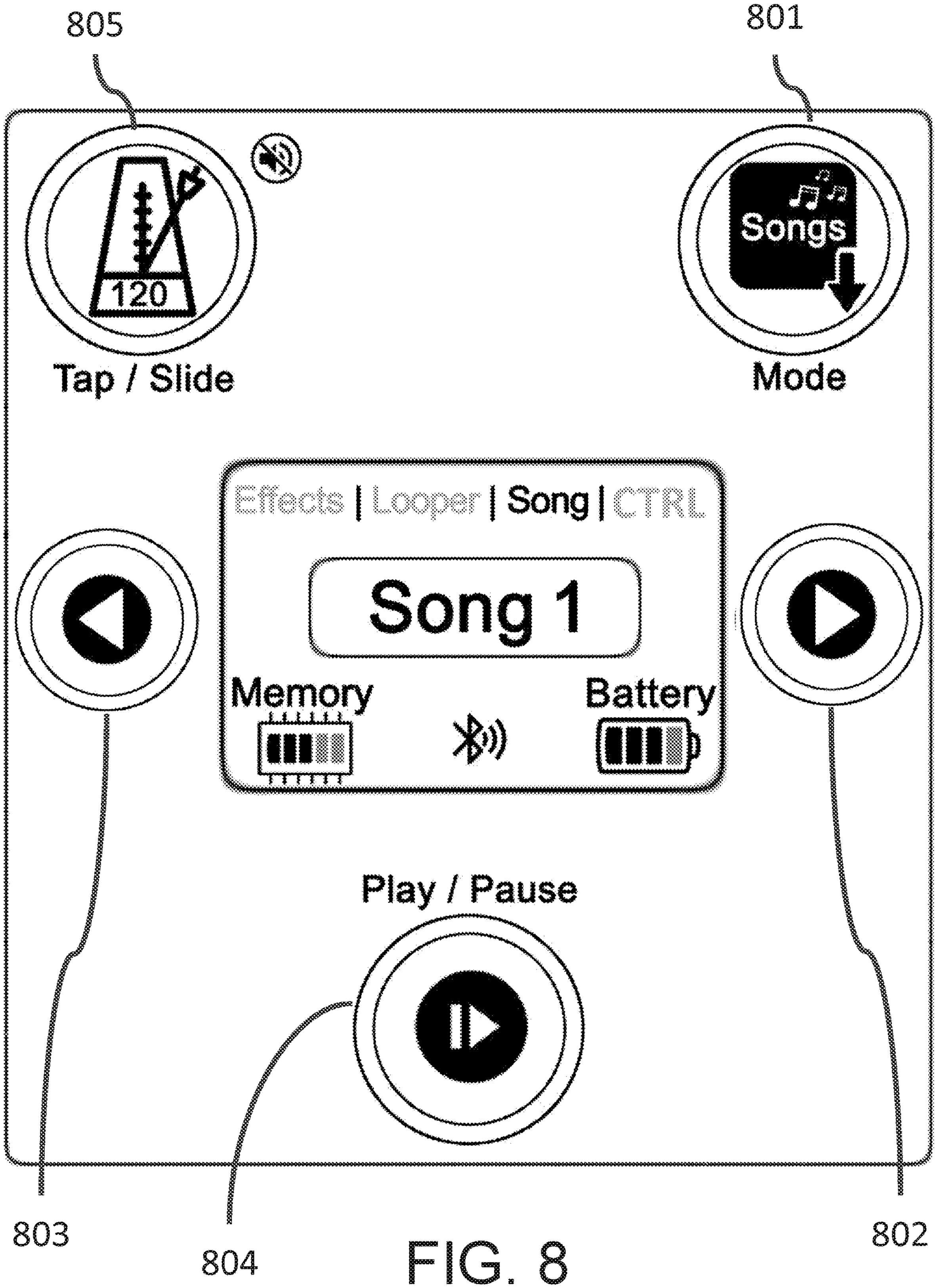
FIG. 8 shows the Song Mode graphical user interface.
Figure 9A:
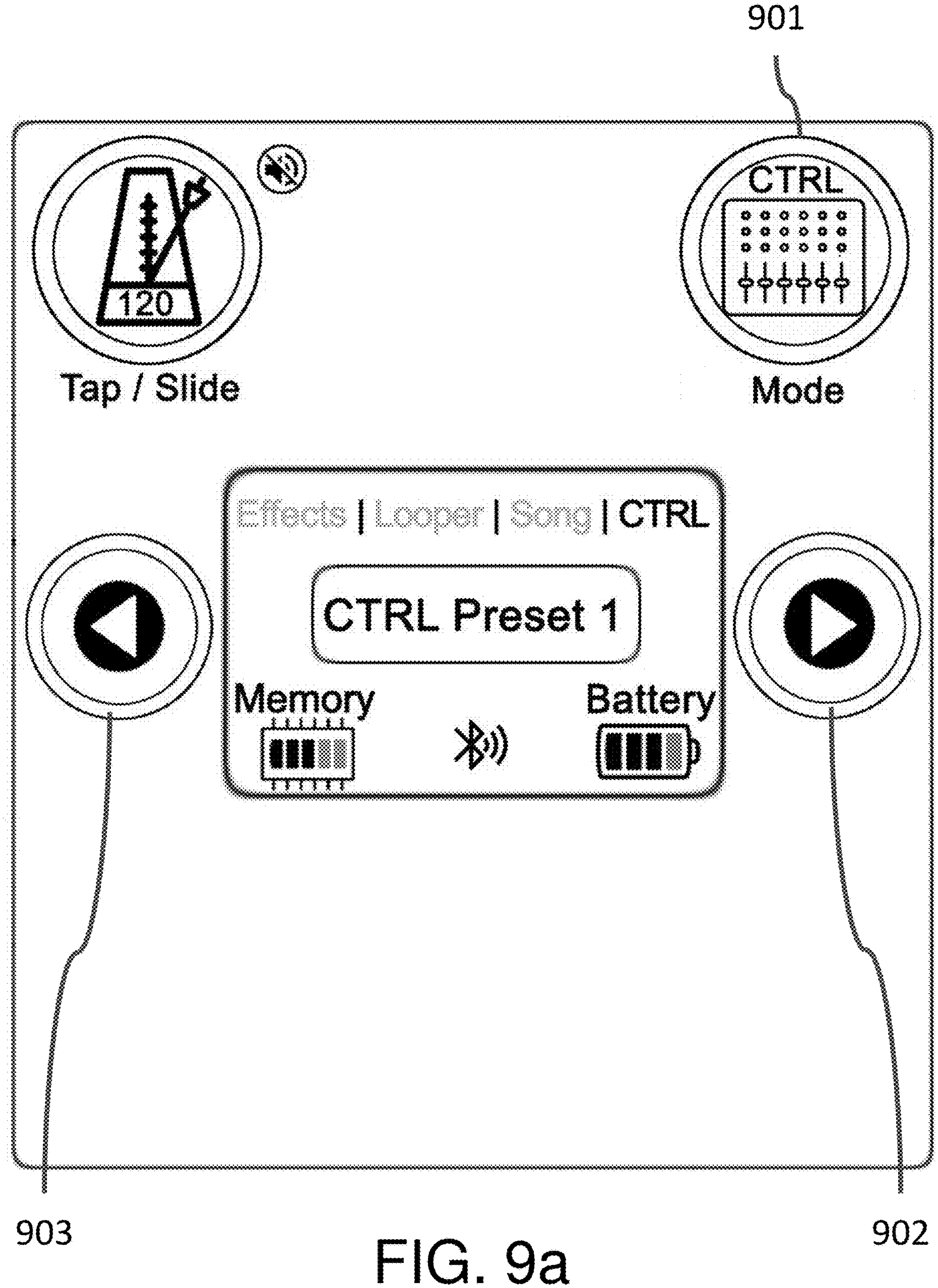
FIG. 9*a* shows the Controller Mode graphical user interface.

In the preferred embodiment, the iTap Pedal has four modes—Audio Effects Mode (FIG. 5*a*, FIG. 5*c*, FIG. 6*d*), Looper Mode (FIG. 7), Song Mode (FIG. 8), and Controller Mode (FIG. 9*a*). Modes can be changed by tapping on the Mode button (for example, FIG. 5*a* 501) in all of the modes. The iTap Pedal's foot-enabled, flat, touch screen display dynamically changes to represent the different selected audio effects/presets, loops, songs, and/or controls.

In Effects Mode as shown in FIG. 5*a*, the graphical user interface 500 displayed on the touch screen is used to select audio effects and/or audio effect presets. The user can scroll through defined effects and/or presets by tapping on the forward button 502 or the back button 503. The current mode (Effects Mode) and selected audio effect/preset (Preset 1) is shown in the center box 504. The textual display of the selected audio effect/preset 507 is a button whose label changes as the user scrolls through the defined effects/presets. The Tap/Slide button 505 is used to either tap or select a specific tempo. The tempo selected is represented by an audible click played through the iTap Pedal's audio output and/or graphically displayed by a lighted ring around the Tap/Slide button 505. The audio tempo can be muted by pressing the mute button 506.

Figure 5B:
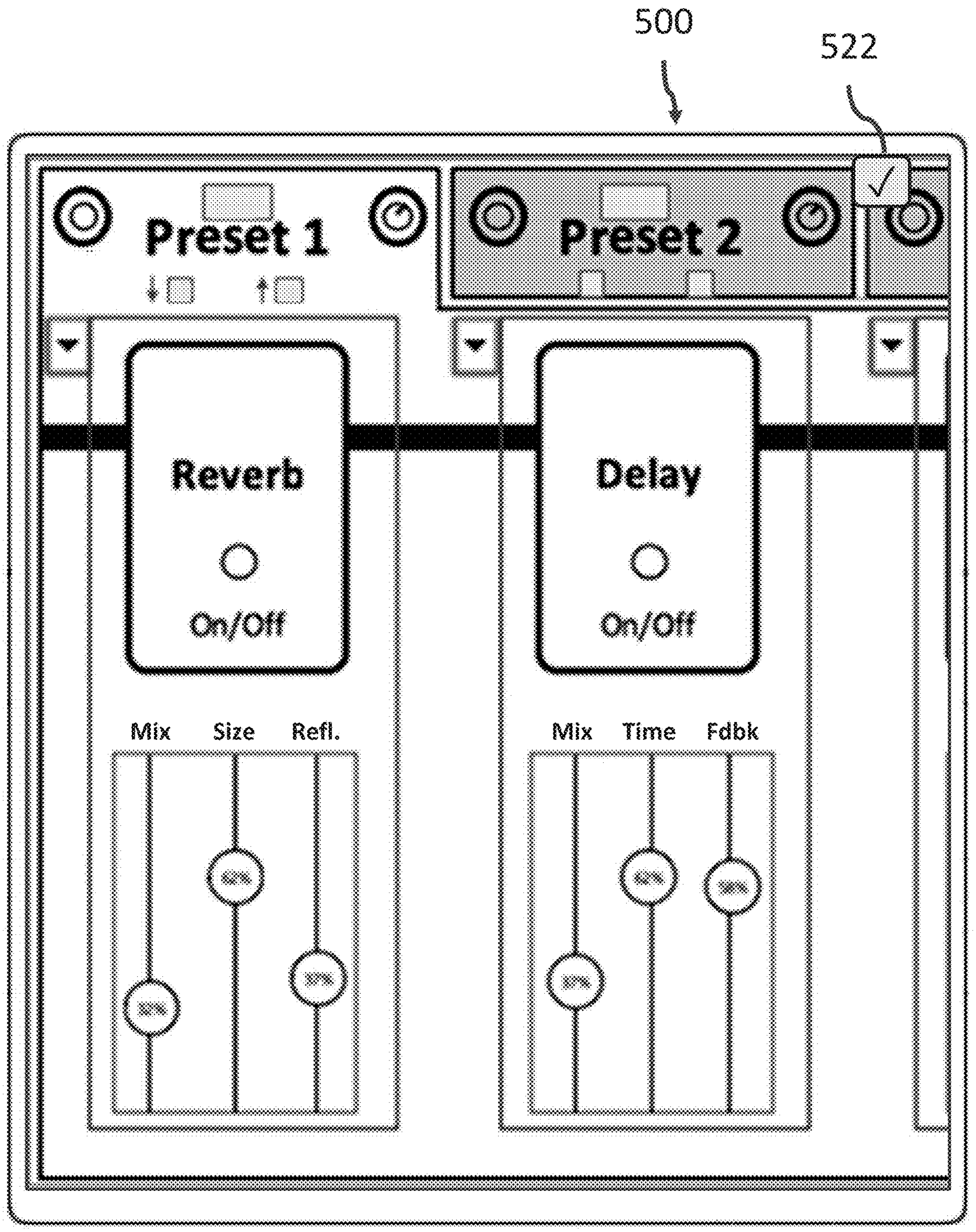
FIG. 5*b* shows the parameter adjustment display (Soundcheck Display) of Audio Effects Mode.
Figure 5C:
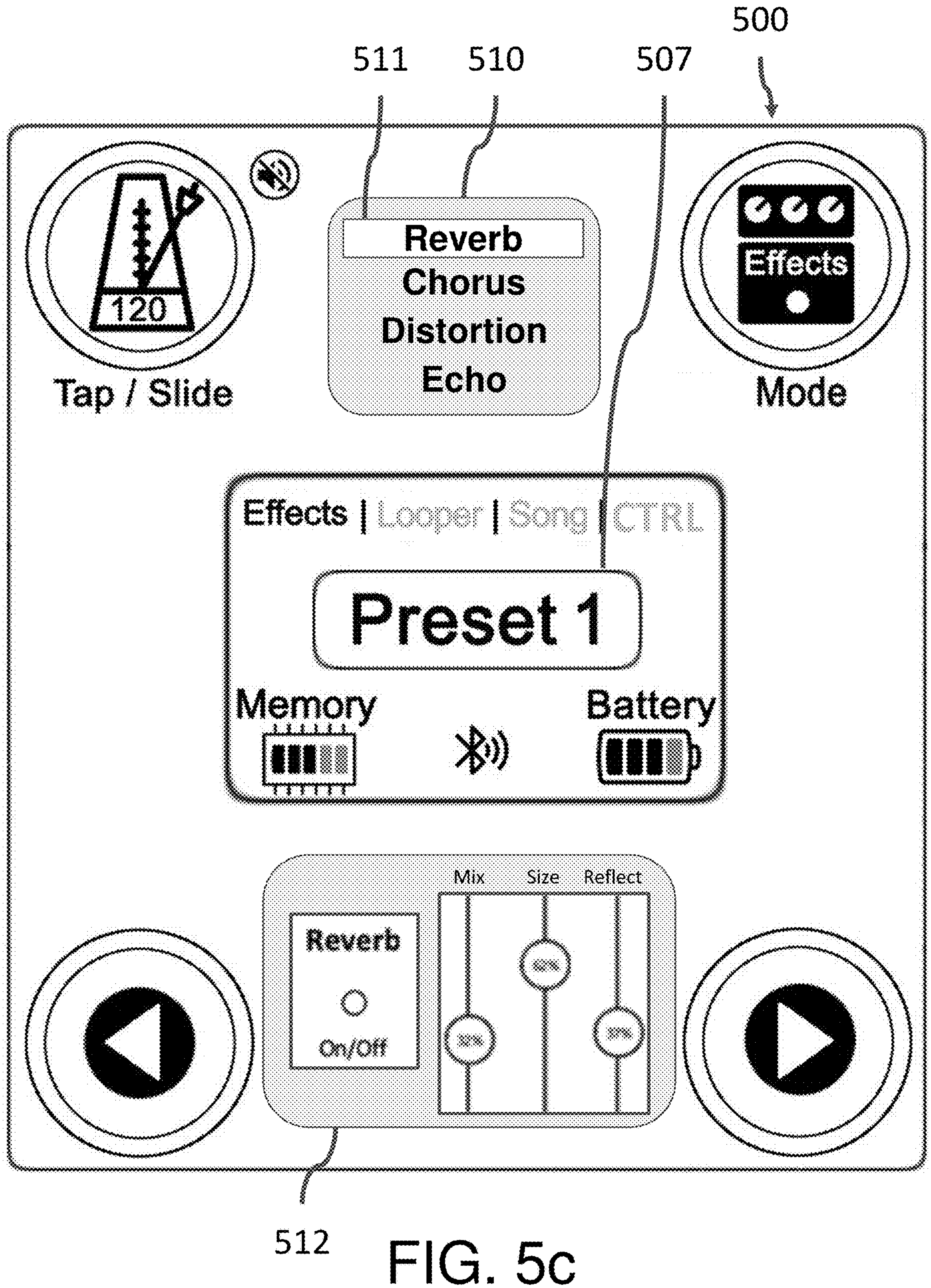
FIG. 5*c* shows the Audio Effects Mode graphical user interface with embedded parameter adjustments for the active preset (Preset 1)

To adjust the parameters for an audio effect, the user can tap on the textual display of the selected audio effect/preset (button) 507 (e.g., "Preset 1"). In one embodiment, tapping on the textual display of the selected audio effect/preset (button) 507 brings up a new screen (called Soundcheck Display) as shown in FIG. 5*b* that allows the user to be able to adjust all parameters for a particular effect preset in that one screen on the iTap Pedal's graphical interface 500. Parameter changes are made by adjusting sliders, buttons, and/or knobs as set forth in the iCable Patent (as discussed above). The user can horizontally scroll to display additional effects in the preset. Audio effect parameter adjustments are made in real-time. When the user is finished adjusting parameters, the user presses the exit button 522 to return to the Effects Mode screen shown in FIG. 5*a*. In another embodiment, as shown in FIG. 5*c*, tapping on the textual display of the selected audio effect/preset (button) 507 brings up a menu of the audio effects in the selected preset 510. The user can select the audio effect to be modified such as Reverb 511 which brings up a graphical interface for graphically adjusting parameters 512.

The user can customize the display of an effect/preset such as changing the graphics, the text, control types (knob/slider), control locations, the orientation of the display (landscape or portrait), colors, and sizes of anything on the display.

Figure 6A:
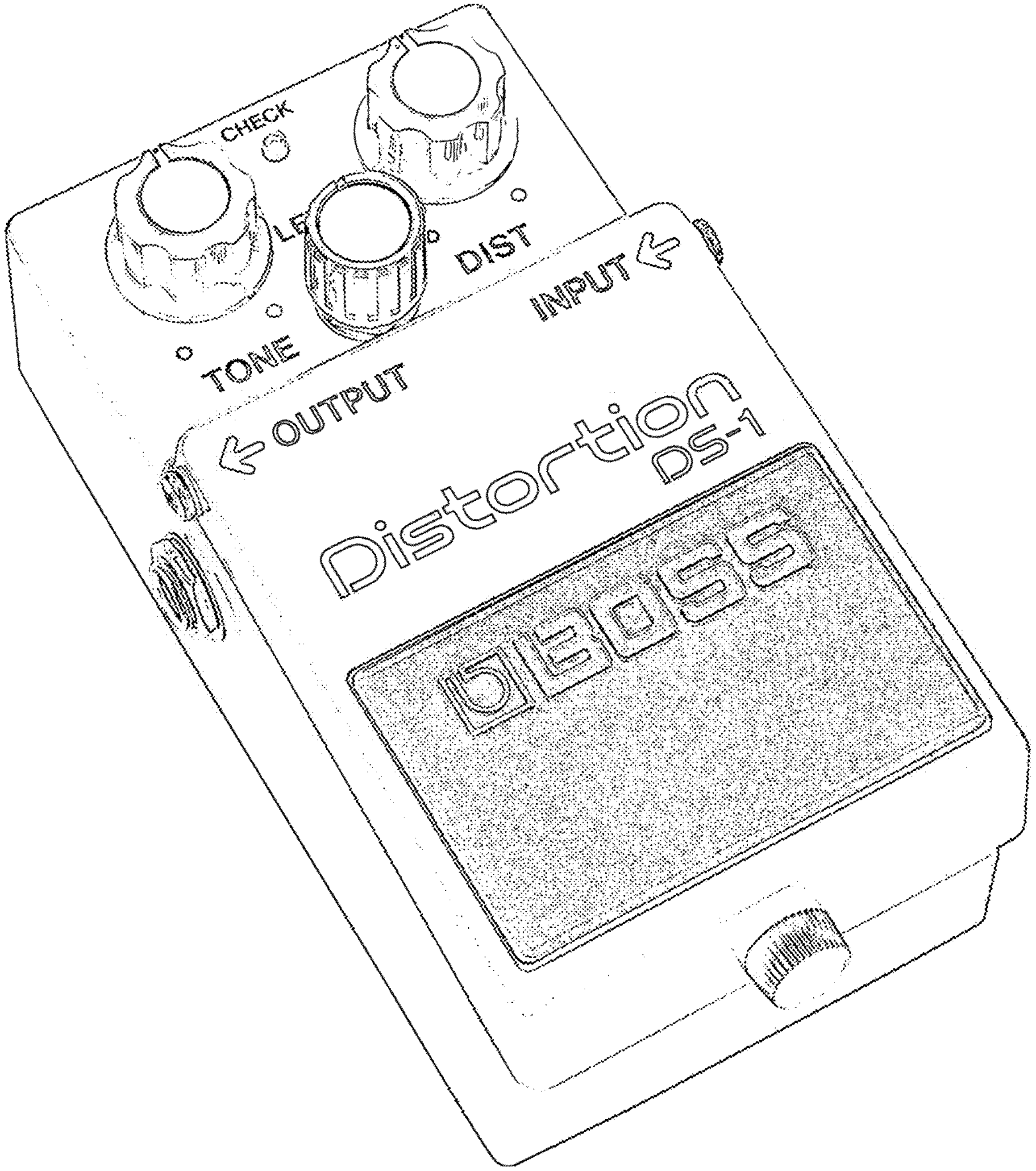
(PRIOR ART) FIG. 6a
FIG. 6*a* shows the prior art Boss Distortion DS-1 Pedal.
Figure 6B:
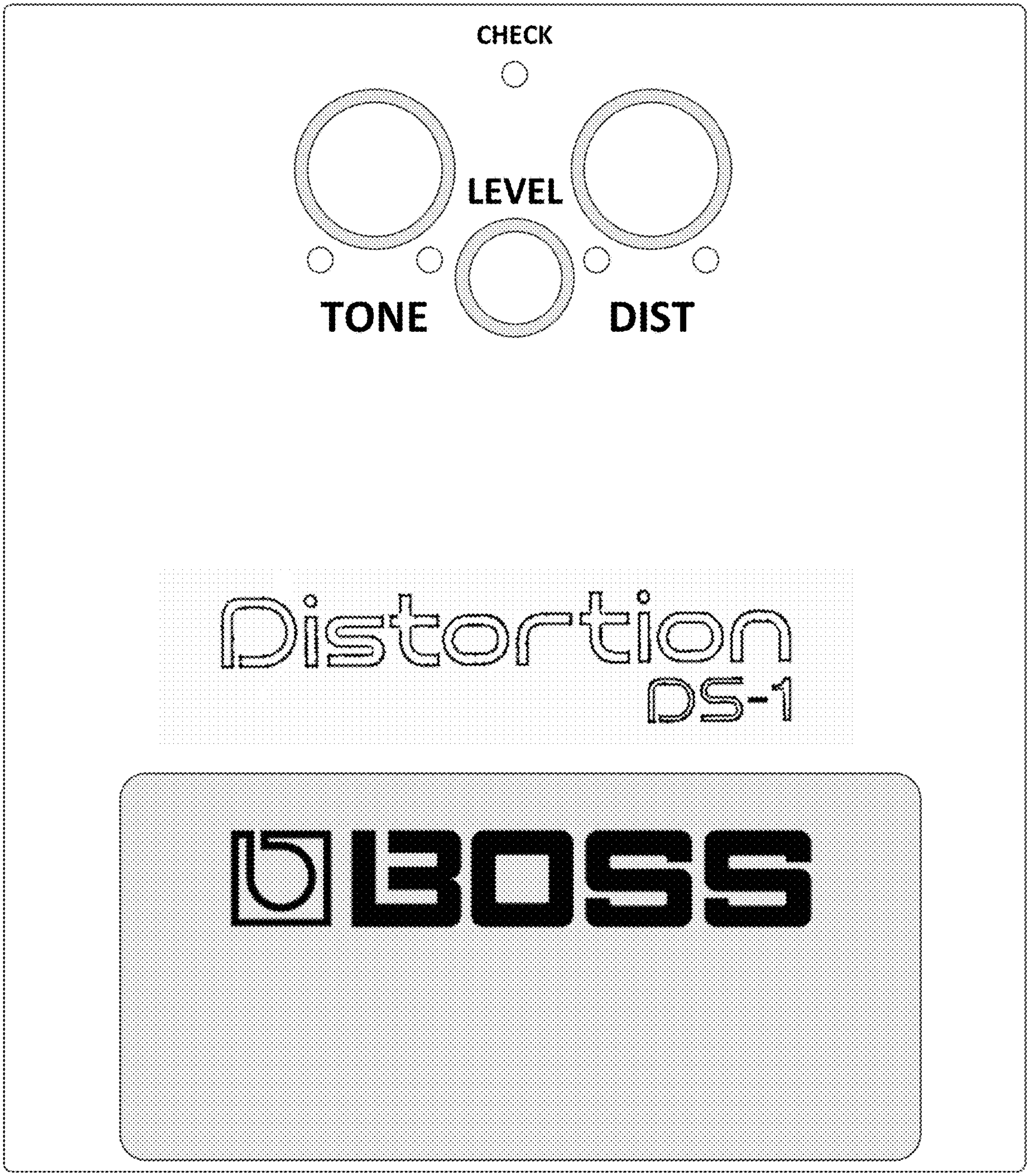
FIG. 6*b* shows a first graphical representation of the Boss Distortion DS-1 Pedal with knobs used for adjusting parameters.
Figure 6C:
FIG. 6*c* shows a second graphical representation of the Boss Distortion DS-1 Pedal with sliders instead of knobs used for adjusting parameters.
Figure 6D:
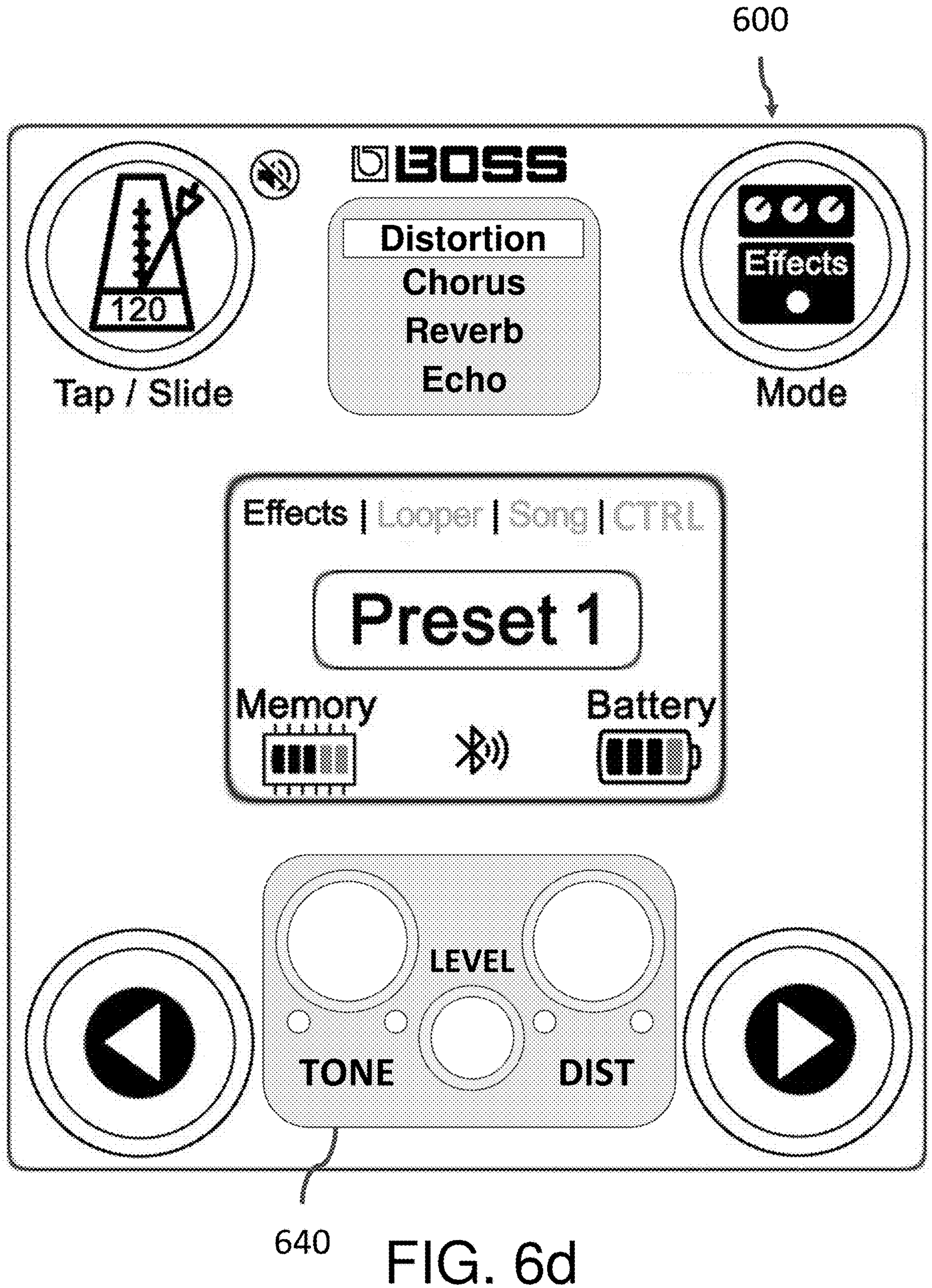
FIG. 6*d* shows the Audio Effects Mode graphical user interface with embedded parameter adjustments for the Boss Distortion DS-1 Pedal.

In one embodiment, the touch screen is used to graphically mimic a user's traditional audio effect pedal where different sections of the surface can be mapped/assigned to adjust different audio parameters. For example, a popular distortion pedal such as the Boss Distortion DS-1 Pedal as shown in FIG. 6*a* can be graphically replicated as shown in FIG. 6*b* so that it looks and operates almost identically to the physical Boss Distortion DS-1 Pedal so that the graphical pedal is familiar to the user. The Tone, Level, and Distortion knobs could be graphically shown on the touch screen and adjusted by a knob (as shown in FIG. 6*b*) or a slider (as shown in FIG. 6*c*). Display preferences such as whether a parameter should be displayed as a slider or a knob or the slider/knob's location can be set in the iTap Pedal App (not shown) or from the iTap Pedal itself. As shown in FIG. 6*d*, the graphical controls of the Boss Distortion DS-1 Pedal can also be displayed in the preset controls area 640 of the iTap Pedal's graphical user interface 600. Parameter adjustments for all of the effects in one preset (similar to the interface shown in FIG. 5*b*) could be displayed as a chain of graphical pedals as shown in FIG. 10*e* and FIG. 10*f*.

Figure 7:
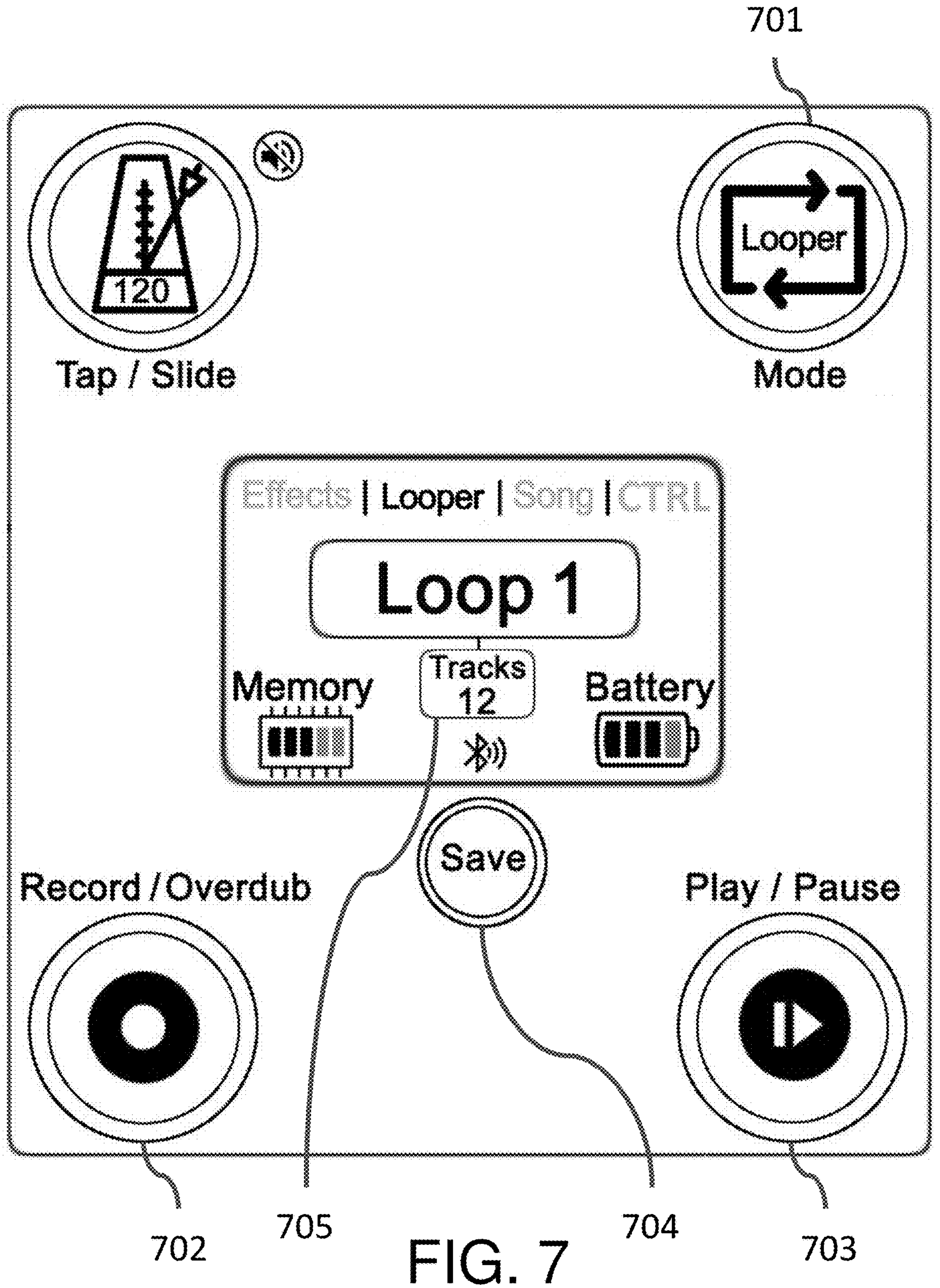
FIG. 7 shows the Looper Mode graphical user interface.

As shown in FIG. 7, Looper Mode 701 allows a user to record audio for a loop using the Record/Overdub button 702 and playback or pause a loop using the Play/Pause button 703. When the user is satisfied with a loop, the user can press the Save button 704 to store the loop in the memory of the iTap Pedal, iCable (as disclosed in the iCable Patent as discussed above), or audio recording software on a laptop or tablet. The number of stored loops/tracks is displayed in the Tracks display area 705. When the iTap Pedal is being used as a wireless controller (as shown in FIG. 3*a*), the loops are stored in an external device such as an iCable. When the iTap Pedal includes digital signal processing capabilities (as shown in FIG. 4*a* and FIG. 4*b*), the loops are stored in the iTap Pedal memory. The parameters/functions that can be changed in Looper Mode include tempo and key (not shown).

As shown in FIG. 8, Song Mode 801 allows a user to scroll through songs using the forward button 802 or the back button 803. The Play/Pause button 804 is used to select, play, and pause a desired song. Holding down the forward button 802 for a few seconds fast forwards a song. Holding down the back button 803 can quickly rewind a song. Songs can be played and paused by pressing the Play/Pause button 804. The parameters/functions that can be changed in Song Mode include adjusting the tempo 805 and the key (not shown).

Figure 9B:
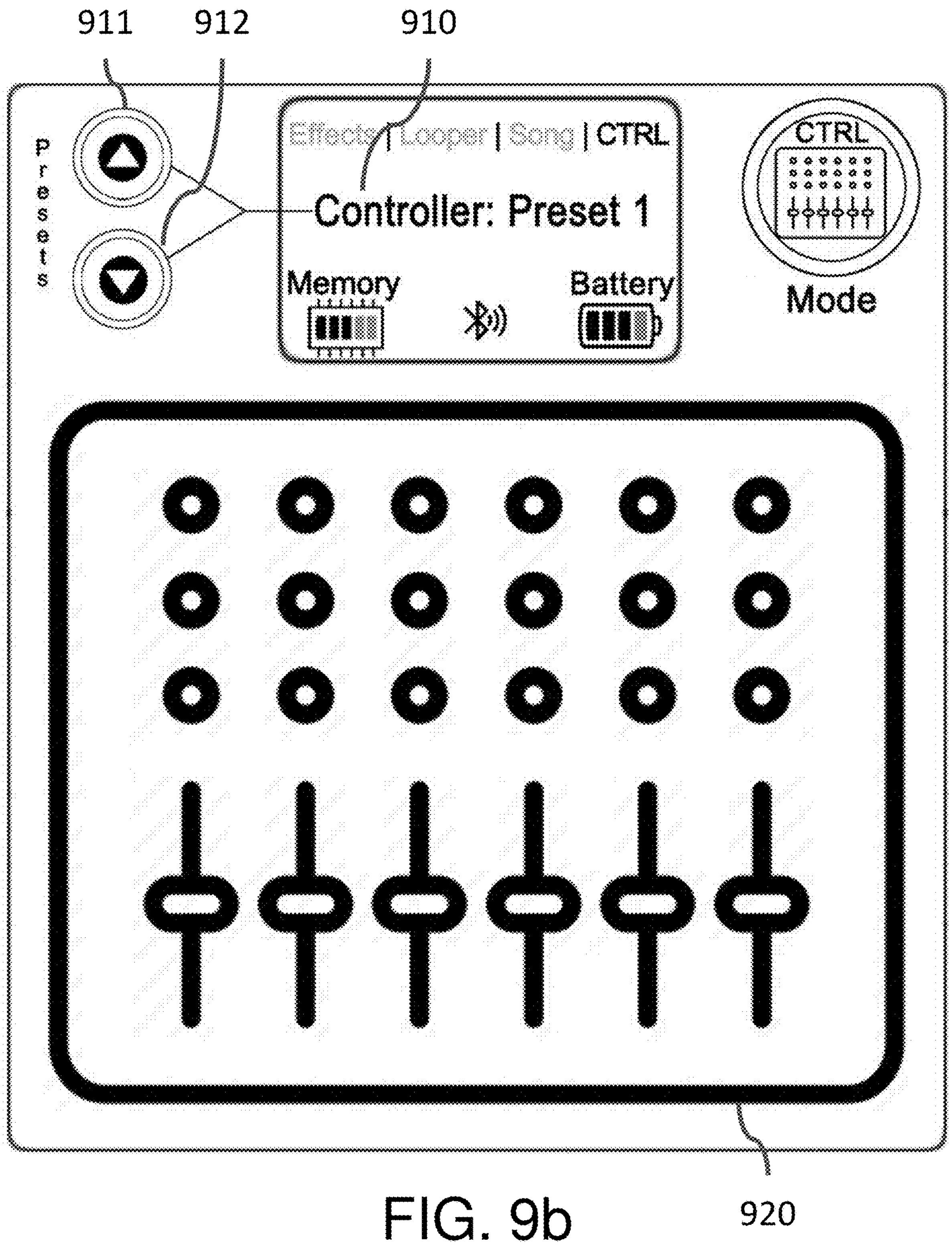
FIG. 9*b* shows the parameter adjustment controls in Controller Mode for the active preset.

As shown in FIG. 9*a* and FIG. 9*b*, Controller Mode 901 allows the user to use the iTap Pedal as a wireless controller to control any type of wirelessly controllable MIDI device or other wirelessly controllable software program. For example, the iTap Pedal can be used to control wirelessly controllable software for lighting, transcription, medical, manufacturing, and sewing/clothing production. Because of the dynamic nature of the screen and iTap Pedal app, the user can create customized controller layouts to either look like a popular MIDI controller such as the Akai Professional MPK Mini MK3 or design a completely new controller. The user can choose the controller switch type (buttons, sliders, or knobs), placement, display (size, color), and function. Any software parameter can be modified in controller mode. For example, the user can assign a controller switch to control a specific function within a music software application such as Apple's Logic or GarageBand to adjust that specific audio element such as On/Off, volume, and/or panning.

The user can also create a controller preset to trigger events by tapping (tilting) or touching/gesturing (discussed below) various sections of the screen with her hands to trigger MIDI events such as mute, volume, or panning on a particular track of music.

A controller may also control software events of a non-audio program. For example, the controller can be used to control lighting software such as AGi32 or Lumen Designer. Controls would include faders (sliders) that dim or raise specific lights.

As shown in FIG. 9*a*, the user can use forward button 902 and back button 904 to scroll through the controller presets. When a preset is selected, the display changes to Live Display as shown in FIG. 9*b*. To change controller presets in Live Display, the user either presses and slides up or down on the textual display of the selected audio effect/preset ("Controller: Preset 1") 910 which is a scrollable menu of controller displays, or presses on the up arrow 911 or down arrow 912. When the desired controller preset is located, the user either releases her finger from the screen or holds down either of the preset up arrow 911 or down arrow 912 for a few seconds. The selected preset controls 920 are then displayed. When pressing an arrow (up arrow 911 or down arrow 912), the arrow's halo begins to blink and will continue to blink until either no activity is found for a period of time or if the user takes action such as a double tap.

Figure 10A:
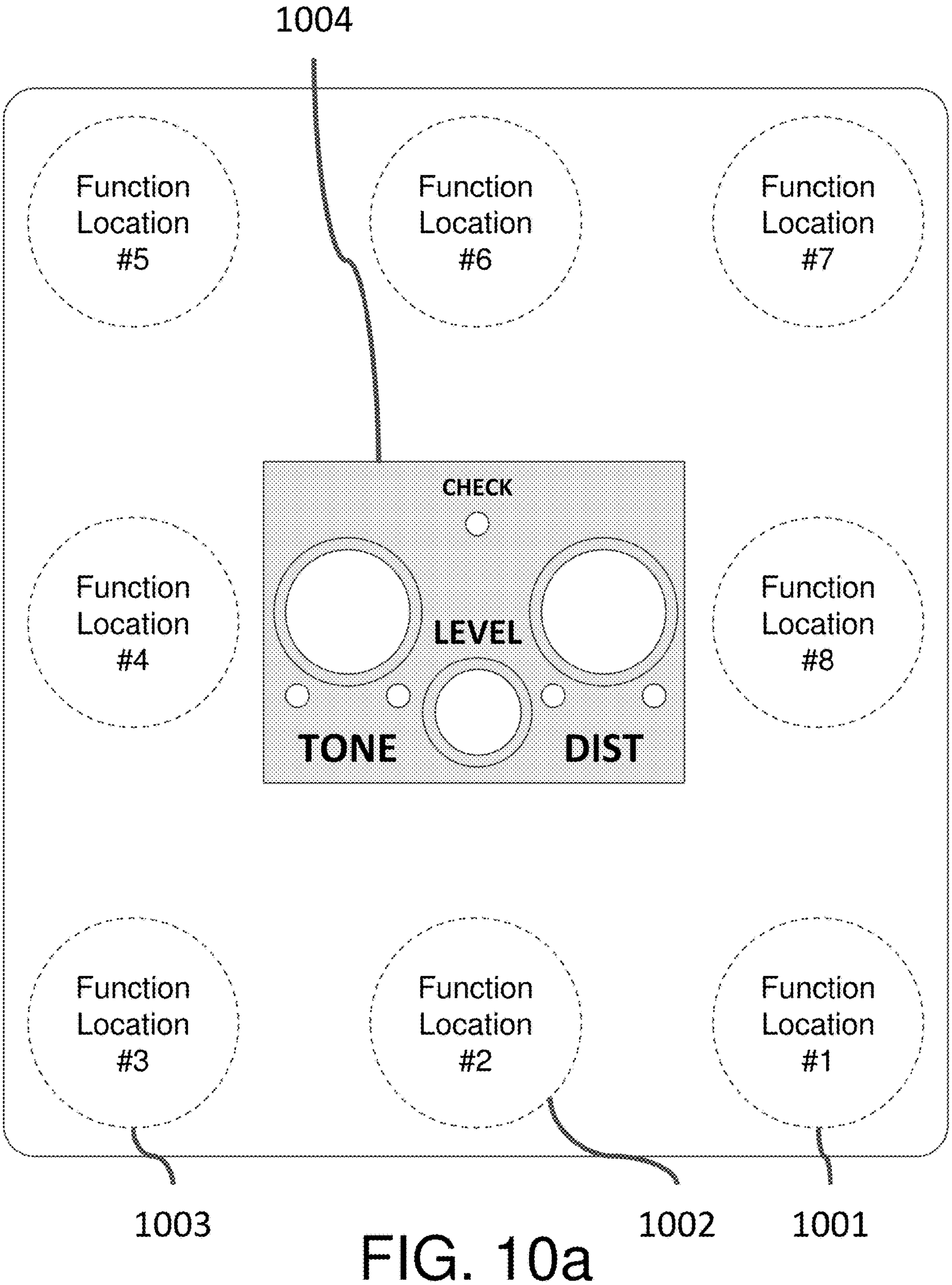
FIG. 10*a* shows a function location view of Live Display.

In one embodiment as shown in FIG. 10*a*, specific audio effects, audio effect presets, loops, songs, and controller functions can each be assigned to different touch screen locations/pedal buttons/tilt directions ("function locations"). For example, a Strymon BigSky virtual pedal can be assigned to function location #1 1001. A preset containing reverb, delay, chorus, and distortion can be assigned to function location #2 1002. A TC Electronic Ditto+ virtual pedal can be assigned to function location #3 1003. When a user taps on a function location, the function assigned to that function location is activated or deactivated. When a virtual pedal, preset, loop, song, or controller is selected, the center display section 1004 displays a virtual representation of that function and its parameters. The user can then bend down to the pedal to adjust parameters or settings for the selected function. Alternatively, the user could also adjust parameters and settings for the selected function using the iTap Pedal App or through gestures (discussed below). A user can assign any function to any function location on the display. Further, the iTap Pedal can store multiple displays.

Figure 10B:
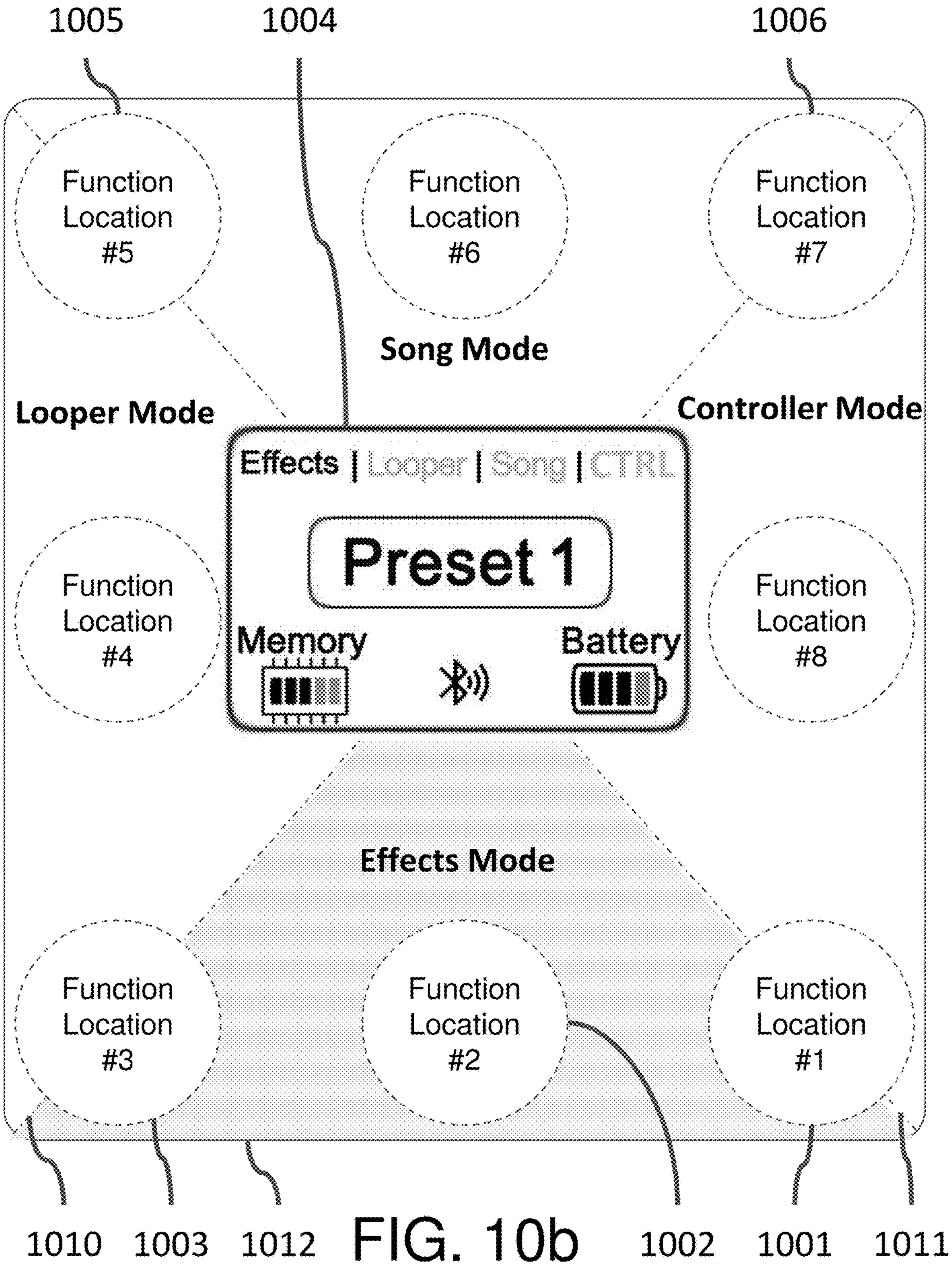
FIG. 10*b* shows a function location view of Live Display with four modes.

In one embodiment, the iTap Pedal display is divided into function-related zones as shown in FIG. 10*b*. For example, the iTap Pedal can be divided into four sections with lines 1010 and 1011. Each section, such as section 1012 (Effects Mode) represents a different mode. Modes are selected by tapping the middle function location of each section. For example, Effects Mode can be activated by tapping Function Location #2 1002. When Effects Mode is activated, Function Location #1 1001 becomes a forward button (such as the forward button shown in FIG. 5*a*). Likewise, Function Location #3 1003 becomes a back button (such as the back button shown in FIG. 5*a*). Function Location #5 1005 can then become a Tap/Slide button (such as the Tap/Slide button shown in FIG. 5*a*) to control tempo. Other pedal mode functions can be assigned to Function Location #7 1006.

In the preferred embodiment, after editing parameters, the parameters are automatically saved after a period of inactivity (i.e., after the user ceases using the device and doesn't touch the screen) set by the user in the iTap App or the iTap Pedal.

In one embodiment, after editing parameters in Soundcheck Display (using a plurality of sliders and/or knobs such as shown in FIG. 5*b*), the iTap Pedal can automatically enter Live Display (such as shown in FIG. 5*a*) after a period of inactivity from the user (i.e., after the user ceases using the device and doesn't touch the screen) set by the user on the iTap Pedal App or iTap Pedal. The user can also turn off the automatic switching feature and manually switch from Sounchcheck to Live Display and back by pressing a display mode button (not shown).

Figure 10C:
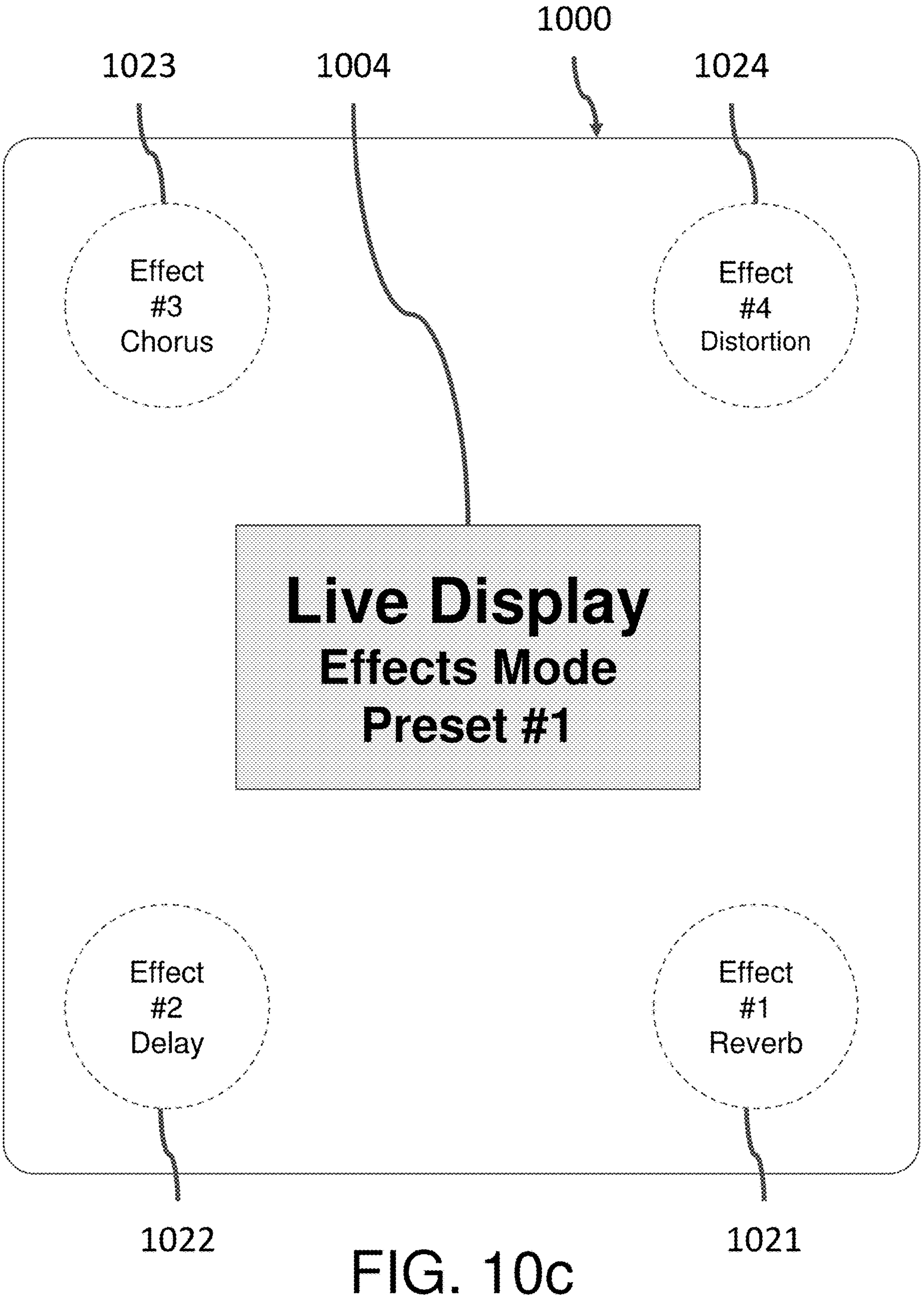
FIG. 10*c* shows a textual pedal board in Live Display (Preset 1)
Figure 10D:
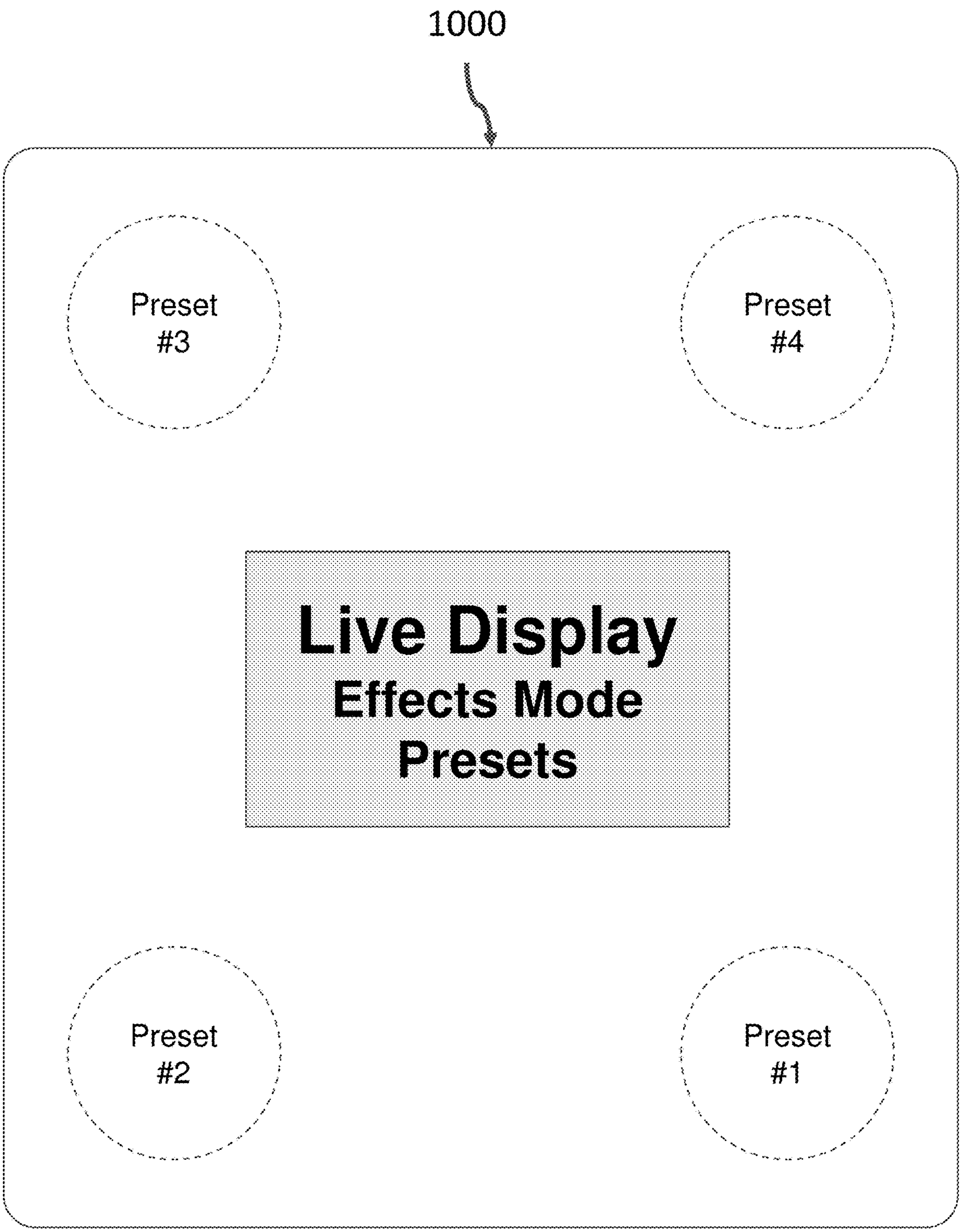
FIG. 10*d* shows a textual preset pedal board in Live Display.
Figure 10E:
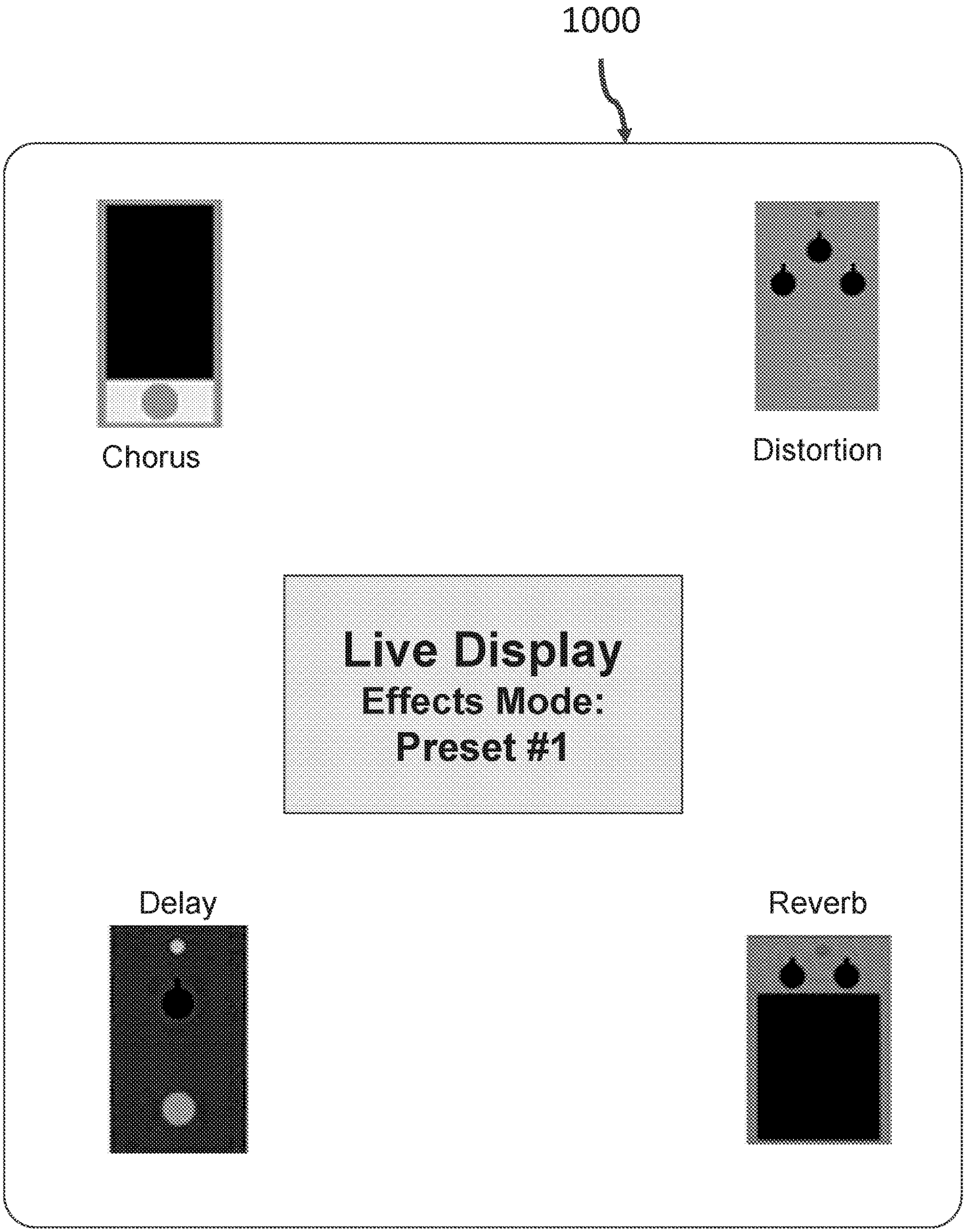
FIG. 10*e* shows a graphical pedal board in Live Display (Preset 1)
Figure 10F:
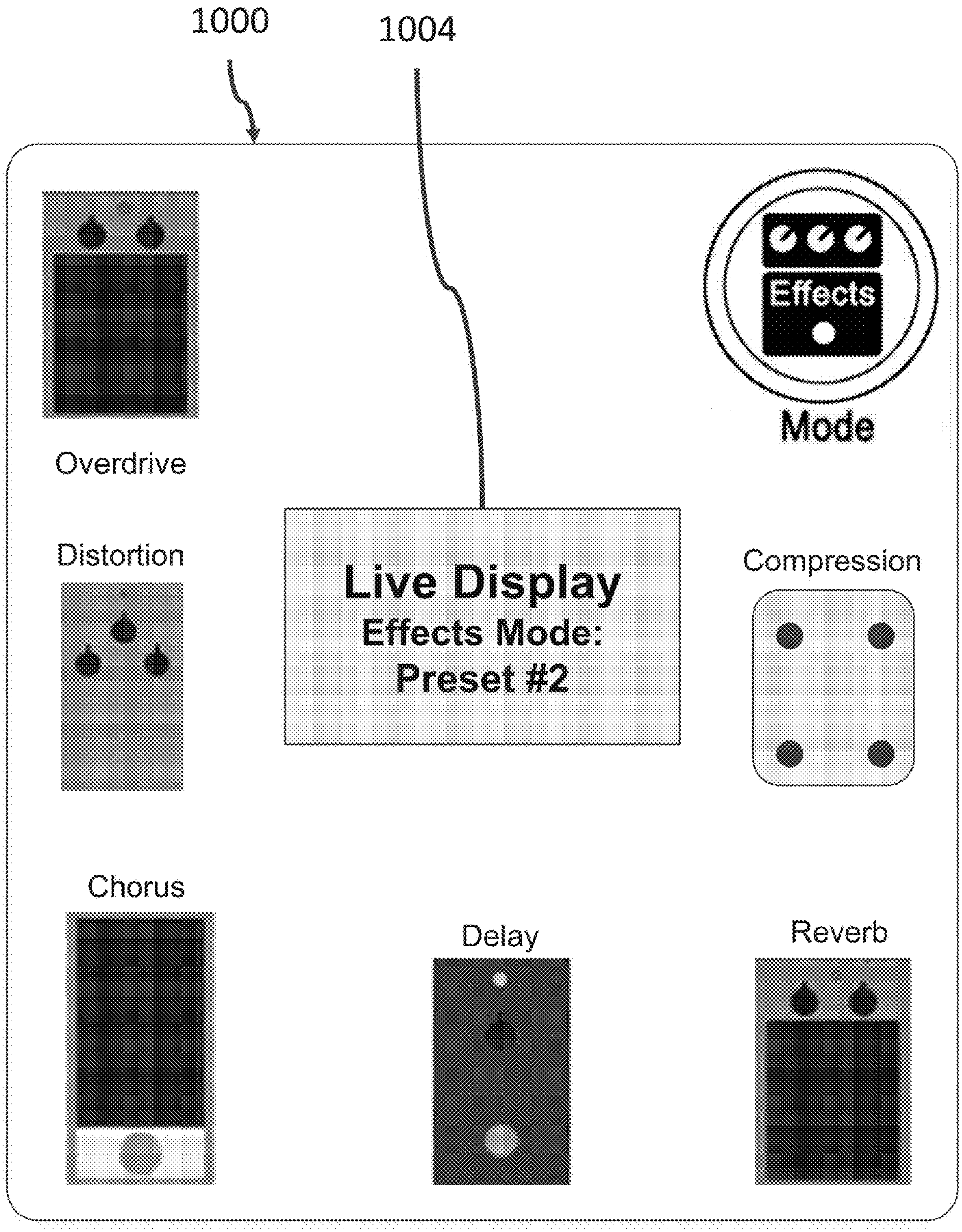
FIG. 10*f* shows a graphical pedal board in Live Display (Preset 2)

In Live Display, mode-specific hot buttons are displayed in each corner of the iTap Pedal screen (in the Function Locations shown in FIG. 10*a*) specific to the particular mode chosen. For example, in Live Display in Effects Mode, the user can fill each of the function locations with a different effect as shown in FIG. 10*c* and/or a different preset as shown in FIG. 10*d*. FIG. 10*c* (textual display) and FIG. 10*e* (graphical display) show how the iTap Pedal display 1000 can be used to replace a traditional pedal board. The user can use the Live Display Effects Mode to test out different combinations of preselected audio effects.

As shown in FIG. 10*c*, each audio effect can be assigned to its own function location. For example, Preset #1 as displayed in center display section 1004 comprises four audio effects—Reverb 1021, Delay 1022, Chorus 1023, and Distortion 1024, applied in that order. The user can then turn on and off any of the four audio effects by activating or deactivating the desired function locations by using the iTap Pedal tilt mechanism, the iTap Pedal touch screen, and/or the iTap Pedal App. When an audio effect is active, the corresponding function location is backlit in green. When an audio effect is not active, the corresponding function location is backlit in red.

In FIG. 10*d*, the iTap Pedal display 1000 can be used to turn on and off audio effect presets. Each audio effect preset can be assigned to its own function location. The user can then turn on and off any of the four audio effect presets by activating or deactivating the desired function locations by using the iTap Pedal tilt mechanism, the inverted pedal buttons, the iTap Pedal touch screen, and/or the iTap Pedal app. When an audio effect preset is active, the corresponding function location is backlit in green. When an audio effect preset is not active, the corresponding function location is backlit in red.

Each mode's Live Display has its own customizable screen set by the user from the iTap Pedal App or directly from the iTap display itself. In one embodiment, the hot buttons in Live Display can be filled with functions from different modes (Effects, Looper, Song, and/or Controller). The user can store multiple different customized Live Display modes to use in different settings. For example FIG. 10*e* shows the Live Display Effects Mode for Preset #1 and FIG. 10*f* shows the Live Display Effects Mode for Preset #2.

Figure 10G:
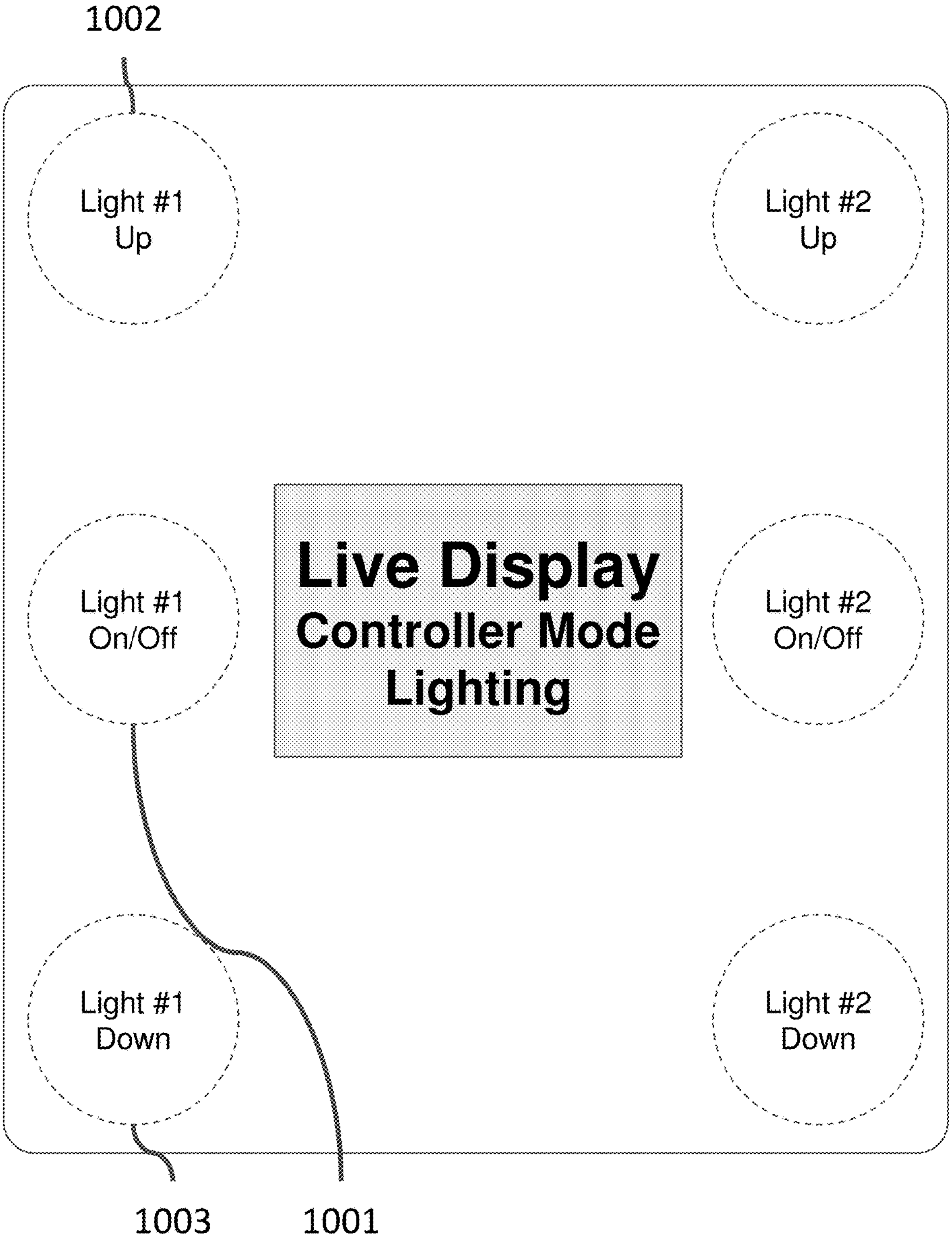
FIG. 10*g* shows a textual lighting controller in Live Display.

FIG. 10*g* shows one embodiment of how the iTap Pedal in Controller Mode might be used to control lighting. The Light #1 button 1001 is selected to activate Light #1 control and is backlit in green. The user then taps function locations 1002 and 1003 to change the light level up and down respectively. The iTap Pedal could also mimic a lighting foot controller such as the Chauvet DJ Foot-C 2 36-channel DMX Foot Controller.

Function Selection

Figure 11A:
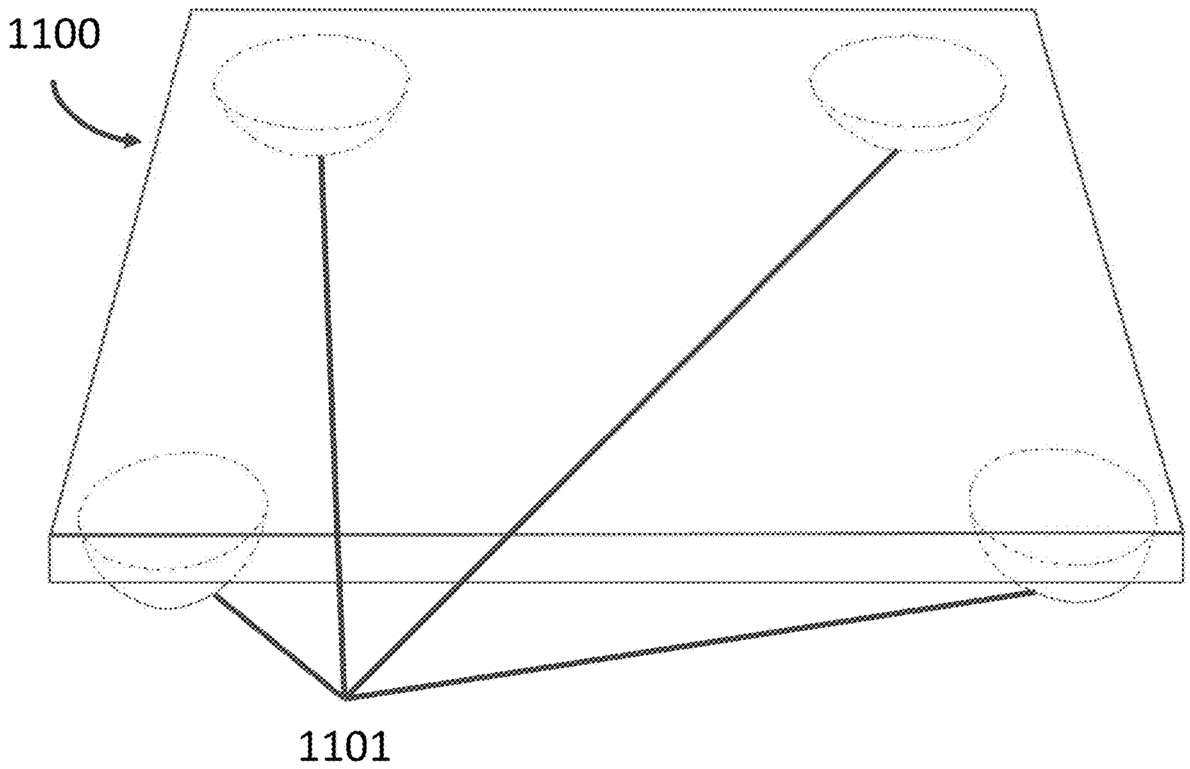
(PRIOR ART) FIG. 11a
FIG. 11*a* shows a prior art weight scale with inverted pedal buttons.
Figure 11B:
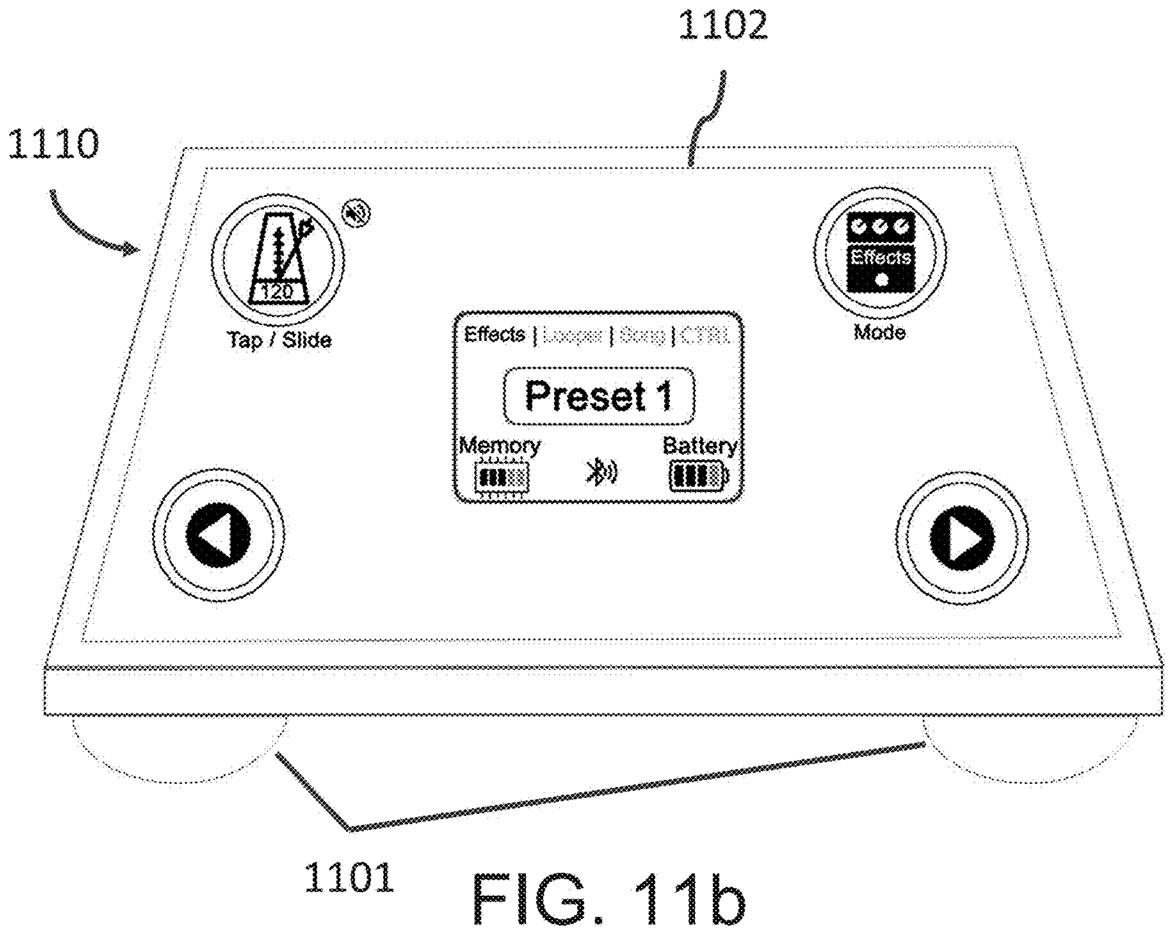
FIG. 11*b* is the front/top perspective view of the inverted pedal buttons embodiment of the invention.
Figure 11C:
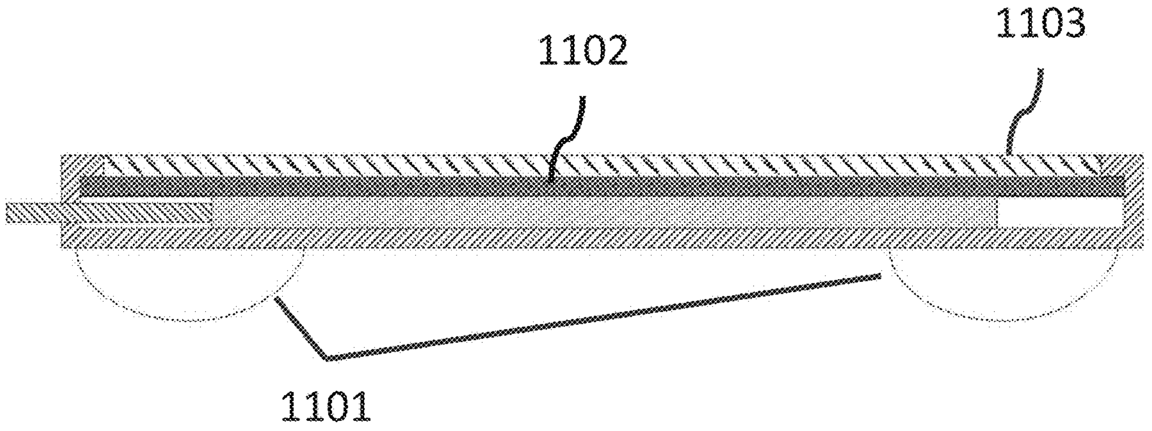
FIG. 11*c* is the front view of the inverted pedal buttons embodiment of the invention.

The pedal functions (function locations) shown in FIG. 5*a*, FIG. 5*c*, FIG. 6*d*, FIG. 7, FIG. 8, FIG. 9*a*, FIG. 9*b*, FIG. 10*a*, FIG. 10*b*, FIG. 10*c*, FIG. 10*d*, FIG. 10*e*, FIG. 10*f*, FIG. 10*g*, and FIG. 11*b*, can be selected (activated and deactivated) in many different ways: (i) using the tilt of the tilting mechanism 304 in FIG. 3*a* (also shown as the tilting mechanism 304 of FIG. 4*a* and FIG. 4*b*); (ii) using inverted pedal buttons 1101 as shown in FIG. 11*b* and FIG. 11*c* on the bottom of the iTap Pedal 1110 below the touch screen 1102; (iii) using the touch screen—either with the musician's fingers or with a special contact surface on the musician's shoe; and/or (iv) gestures (discussed below).

Tilt

In the preferred embodiment, a 6 Degree of Freedom (6-DoF) sensor such as a STMicroelectronics LSM6D33 is used to sense motion and orientation. The 6-DoF sensor combines a 3-axis accelerometer (to sense gravity to determine which direction is down towards the Earth or how fast the board is accelerating in 3D space) with a 3-axis gyroscope (to measure spin and twist). As shown in FIG. 3*a*, the four-cornered iTap Pedal 300 can be tilted/pushed at each of the four corners and in the four edges between the four corners to create the appearance of eight function buttons (as shown in FIG. 10*a*). When the edge/space between two corners is pressed, it has the effect of pressing down the two corners at once. The 6-DoF sensor can distinguish the difference between tilting towards a corner or tilting towards an edge. Further, the 6-DoF sensor can distinguish between a single tap and a double tap, thus providing audio effect programmers and/or the musician more options for control of a function location. Any 2-3 axis tilt sensor should be able to distinguish between taps at the four corners of the iTap Pedal 300.

Figure 16:
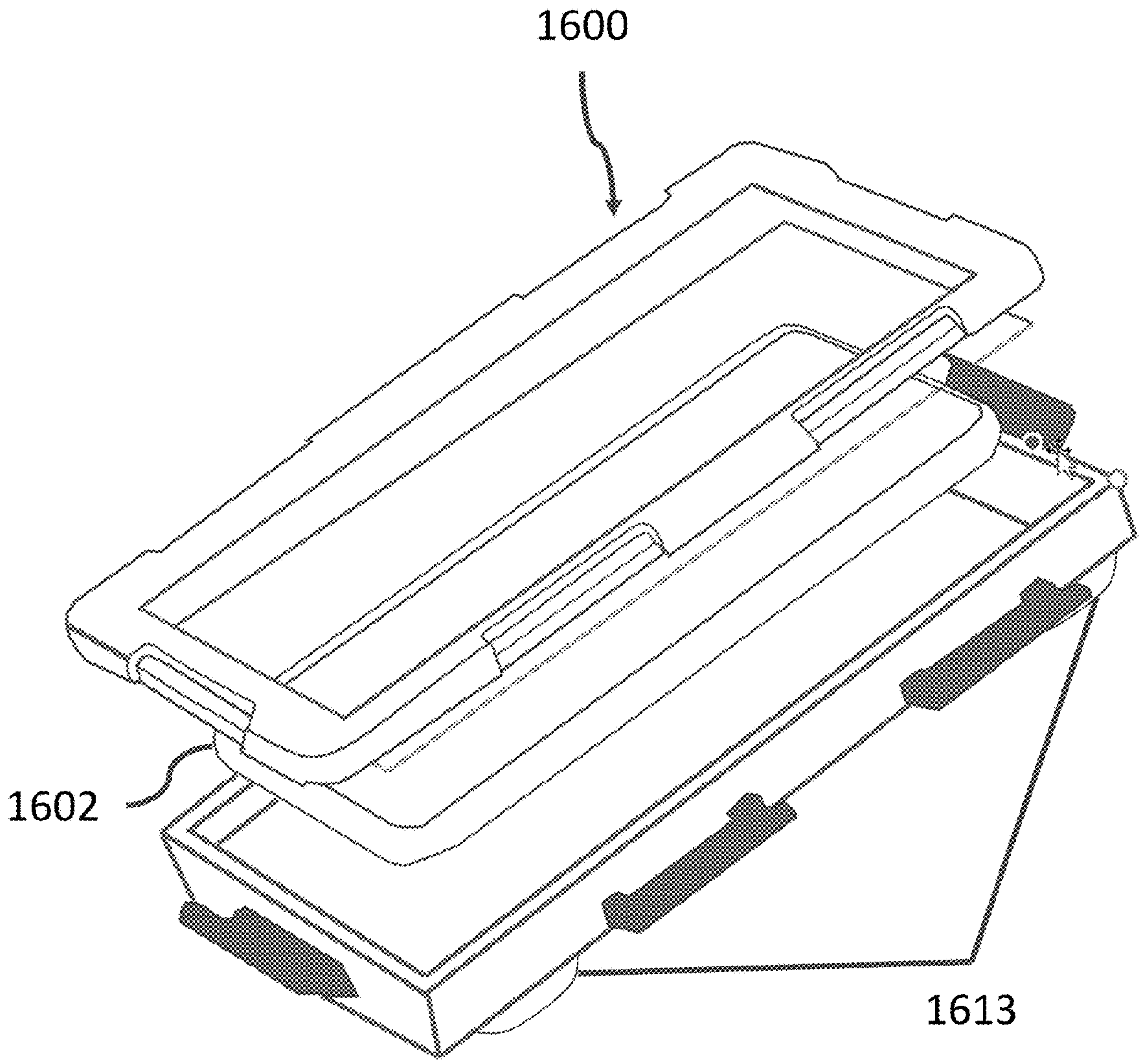
FIG. 16 shows an exploded view of a simple ruggedized smartphone/tablet iTap Pedal Case with inverted pedal buttons.

The iTap Pedal 300 tilts when the musician presses down on a corner or side of the iTap Pedal 300 with the musician's foot. Due to the high sensitivity of the 6-DoF sensor, the amount of tilt necessary to indicate a pedal tap/stomp is very small (no more than a 1-2 mm deflection on a corner), therefore the tilt mechanism 304 can be simple. For example, the tilt mechanism 304 could be one or more gel, foam, silicone, or rubber pads or cylinder of various shapes and sizes between the touch screen 301 and the electronics base 303 (or, in the embodiment of FIG. 4*a*, electronics base 403). Tilt mechanism 304 could also be spherical sectioned pivot such as described in U.S. Pat. No. 5,810,703 issued to Stack, incorporated by reference herein. Rubber bumpers 305 could be used both to inform the musician that the musician has pushed the pedal far enough and to prevent damage to the electronics base 303 and the touch screen 301. A physical object in the shape of a familiar button can be placed on any part of the surface of the iTap. Inactive (electrically disconnected, fake) buttons similar to the active inverted pedal buttons 1101 as shown in FIG. 11*b* and FIGS. 11*c* and 1613 as shown in FIG. 16 could be used to tilt the device as well as to provide additional feedback to the musician. A momentary stomp switch such as the Amplified Parts Single Pole Single Throw (SPST) Momentary Footswitch can be used to tilt the iTap Pedal without clicking and can also be used to tap the tempo in Song or Looper Mode.

Referring to FIG. 3*a*, tilt mechanism 304 (also shown in FIGS. 4*a* and 4*b*, and corresponding to element 1410 in FIG. 14, and 1512 in FIG. 15) can also be a plurality of springs located between the touch screen 301 and the electronics base 303 (or, in the embodiment of FIG. 4*a*, electronics base 403) similar to those described in U.S. Pat. No. 9,522,324 to Levasseur, which is incorporated by reference herein. Such springs would act as a mechanical connection for securing the touch screen 301 and protective cover 302 to the electronics base 303 (or, in the embodiment of FIG. 4*a*, electronics base 403) and allow for the pivotal motion of the touch screen 301, protective cover 302, and an attached tilt sensor (accelerometer/gyroscope, not shown).

Inverted Pedal Buttons

In another embodiment, as shown in FIG. 11*b* and FIG. 11*c*, four active inverted pedal buttons 1101 are located at the corners of the bottom of the iTap Pedal 1110 (below the touch screen 1102). The active inverted pedal buttons 1101 may be inverted stomp switches—the same clicking switches used on traditional stompboxes to turn effects on and off such as the Tayda Electronics Triple Pole Double Throw (3PDT) Stomp Switch, but attached to the iTap Pedal from underneath the device so that they are not visible. The active inverted pedal buttons 1101 operate similar to a button at the bottom of a digital scale as shown FIG. 11*a* that measures a person's weight. Some digital scales use one button under the scale that can be tapped by the user's foot to initialize or calibrate the scale before standing on it. The active inverted pedal buttons 1101 provide the user with a feedback mechanism (button click) to let the musician physically know that a function location has been activated. Like digital scale buttons, the inverted pedal buttons 1101 may be covered in a thick rubber covering to prevent slipping and to protect the pedal button mechanism. A momentary stomp switch such as the Amplified Parts Single Pole Single Throw (SPST) Momentary Footswitch can also be used to not only turn on and off effects without clicking, but can also be used to tap the tempo in Song or Looper Mode. In this embodiment, the display 1102 is mounted to the underside of the top surface or protective cover 1103 such that the display (touch screen) 1102 can be seen (and the touch screen interacted with) through the top surface/protective cover.

The inverted pedal buttons may be active (electrically connected)—used to activate a preset based on which pedal button is pushed lower or clicks. Alternatively, the inverted pedal buttons can be inactive (electrically disconnected, fake)—used just to tilt the device while providing a feedback mechanism for the user. The tilt would be measured by the tilt sensors as described above.

Touch Screen Only

In another embodiment, the capacitive touch screen 301 of FIG. 3 such as the Elo TouchPro or the Shenzhen Yunlea Electronics Co. Industrial OLED Capacitive touch screen can be used to toggle between presets. When a finger touches a capacitive touch screen, some of the electrical charges transfer from the screen to the user. The touch screen's sensors can detect this decrease in electric current and a controller can determine the location of the point touched. Only materials that alter the flow of electric current can operate the touch screen.

To toggle between presets, the musician uses her fingers on the touch screen 301, or alternatively, can use an electrically conductive shoe sole cover to tap on the touch screen 301. The electrically conductive shoe sole cover can be made with conductive fibers in the same way that touch screen gloves enable wearers to use a touch screen (such as their phones) while staying warm.

Similarly, in another embodiment (not shown), electrically conductive pads on top of a resistive touch screen can be used to tap locations such as the corners to activate a function. Pressing on the electrically conductive pads exerts more pressure thus further decreasing the electric current in the touch screen. The electrically conductive pads can also be raised such that it provides the musician with physical feedback such as the sensation found when pressing down and activating typical audio effect pedals.

Figure 12A:
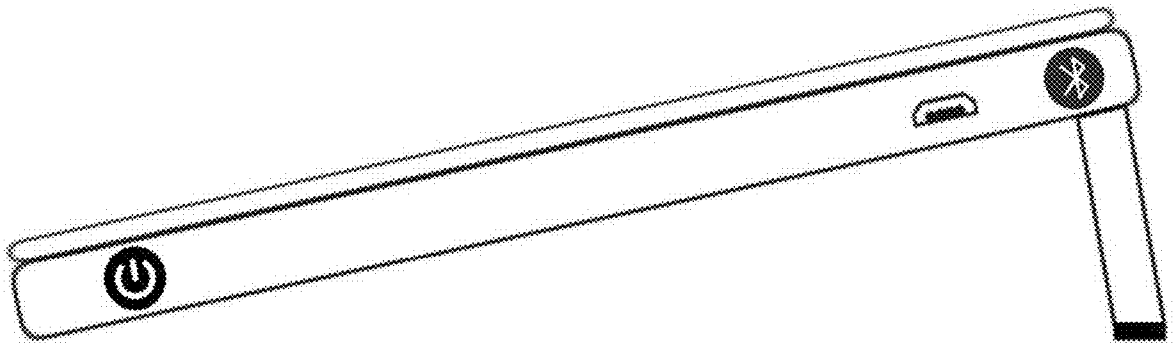
FIG. 12*a* is the side view of the touch screen only embodiment of the wireless iTap Pedal.
Figure 12B:
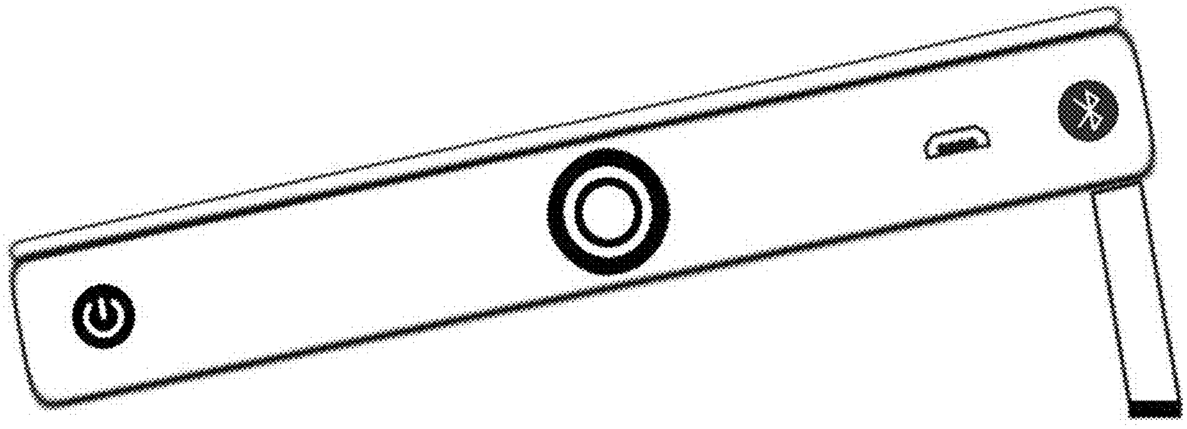
FIG. 12*b* is the side view of the touch screen only embodiment of the cable-ready wireless iTap Pedal with digital signal processing.

FIG. 12*a* and FIG. 12*b* show how a touch screen only approach enables the device to be flat—the touch screen is flush with the electronics base. FIG. 12*a* and FIG. 12*b* also show the difference in thickness between the iTap Pedal without digital signal processing (FIG. 12*a*) and the iTap Pedal with digital signal processing (FIG. 12*b*).

iTap as Rugged Case

In an alternate embodiment, the user can convert their own smartphone/tablet into an iTap Pedal by using a ruggedized iTap Pedal Case. Smartphones/tablets have tilt sensors preinstalled. Therefore, an iTap Pedal App on a smartphone/tablet can register tilt and act as an economical iTap Pedal. In another embodiment, a ruggedized case can incorporate the digital signal processing functionality of the iCable (as disclosed in the iCable Patent as discussed above), similar to what is shown in FIG. 4*a* and FIG. 4*b*. Such a ruggedized case would also comprise a microprocessor, memory, an optional battery, an XLR/1/4" combo input, an XLR/1/4" combo output, and an AC input.

In another embodiment, a ruggedized case may be a wireless/Bluetooth controller for the encased smartphone/tablet. The ruggedized case would comprise a plurality of wireless/Bluetooth (stomp) switches/pedal buttons and a wireless/Bluetooth connect button which allows it to connect to the iTap app on the encased smartphone/tablet. Each pedal button would be surrounded by a halo light. Once the connection between the ruggedized case and the iTap App on the encased smartphone/tablet is made, a wireless/Bluetooth activation light on the ruggedized case will be solid blue to show the connection is active. The ruggedized case's battery is charged through the charger port which optionally can also be used to power the ruggedized case. The ruggedized case is powered on by pressing an On/Off button. The battery status light indicates when the battery is charged (solid green), low (yellow), not charged (red), or charging (flashing red, yellow or green). The halo lights that surround each pedal button would operate in the same manner as the halo lights disclosed in the iCable Patent as discussed above.

Figure 13:
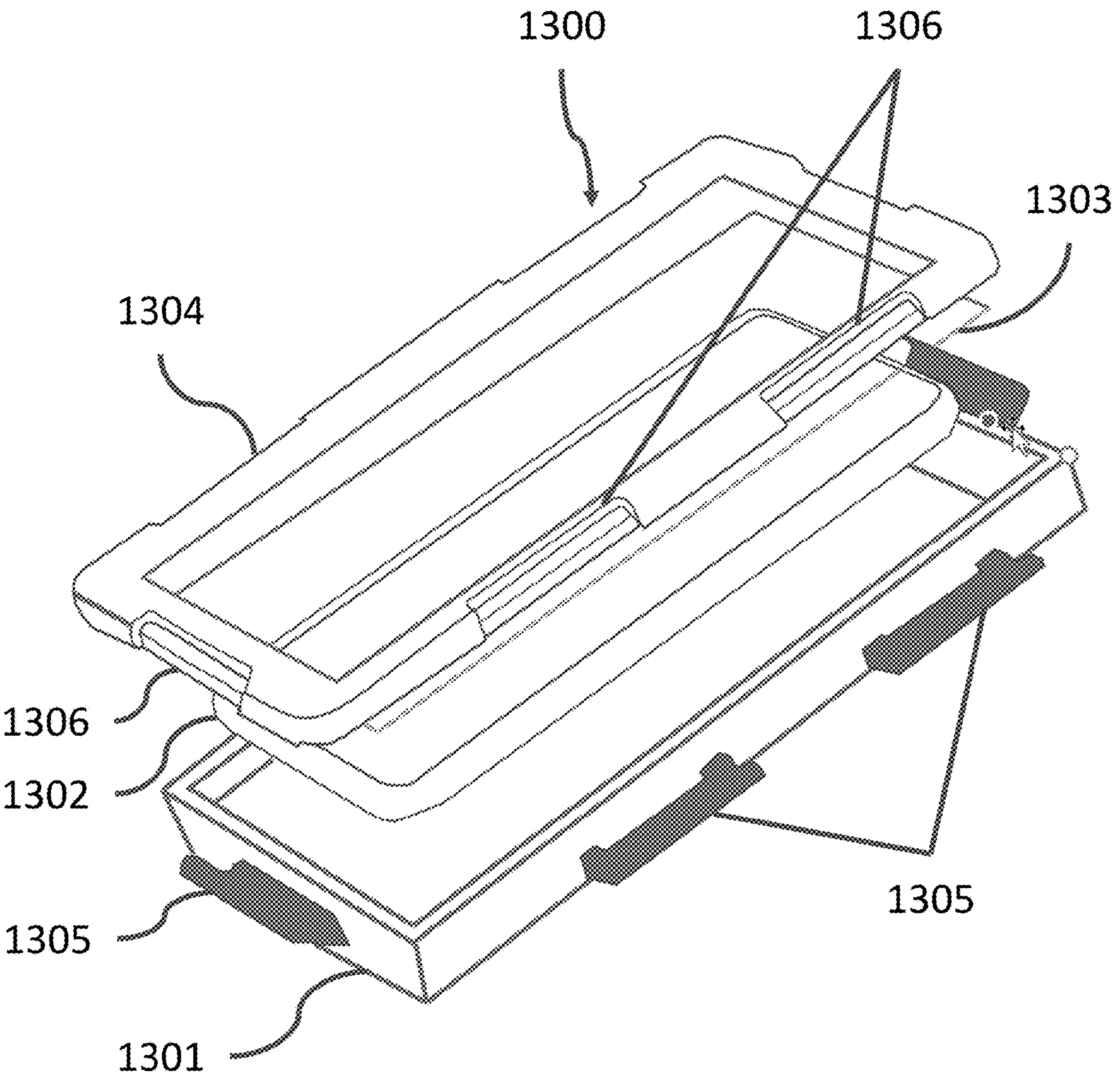
(PRIOR ART) FIG. 13
FIG. 13 shows an exploded view of a prior art simple ruggedized smartphone/tablet case.

FIG. 13 shows an exploded view of a prior art simple ruggedized smartphone/tablet case 1300. When in use, the generic case comprises a base 1301, the smartphone/tablet 1302, a screen protector 1303, a front protective cover 1304, and multiple locks 1305 and lock bases 1306 to secure the front protective cover 1304 to the base 1301.

Figure 14:
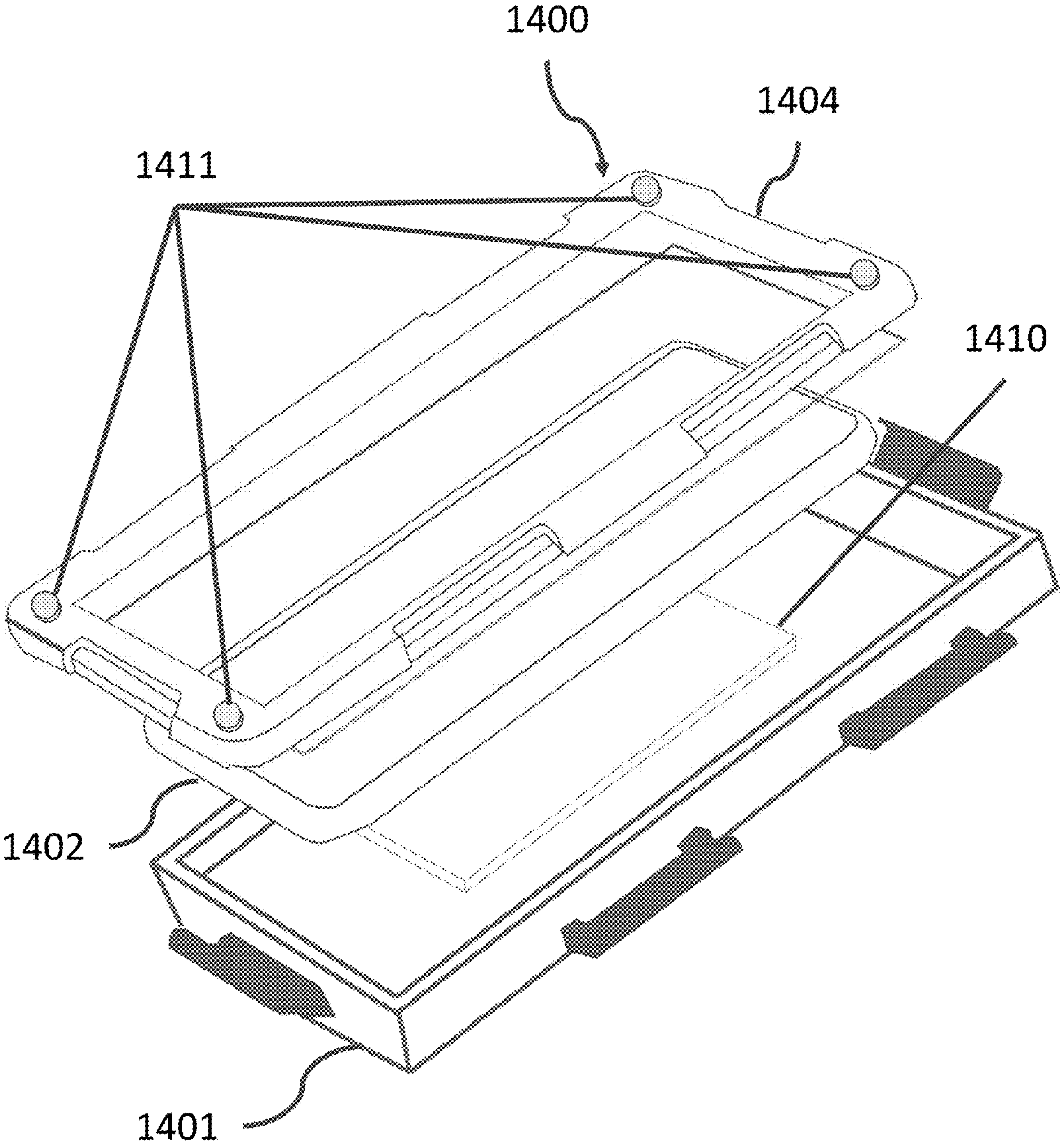
FIG. 14 shows an exploded view of a simple ruggedized smartphone/tablet iTap Pedal Case with internal tilting mechanism.
Figure 15:
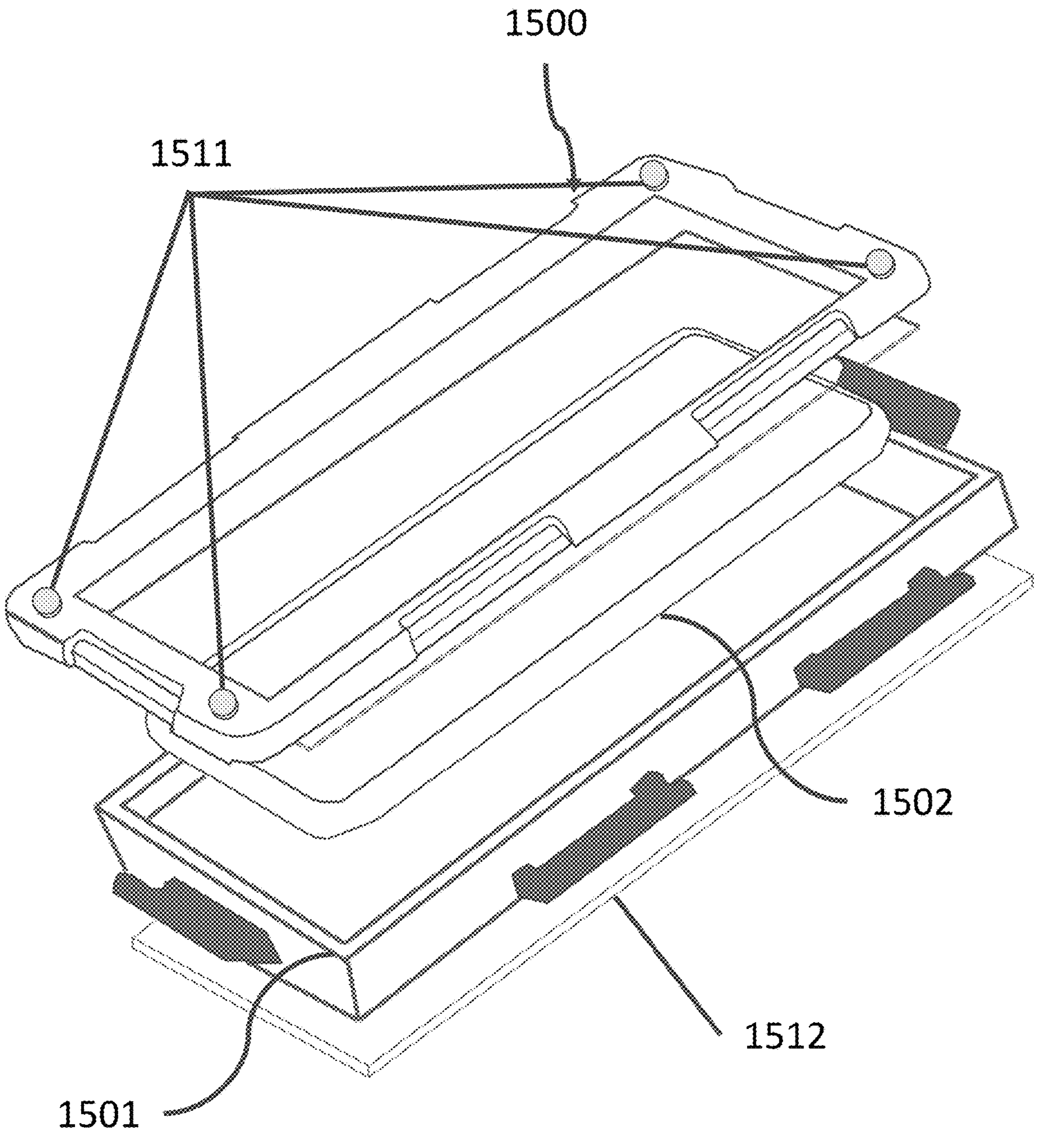
FIG. 15 shows an exploded view of a simple ruggedized smartphone/tablet iTap Pedal Case with external tilting mechanism.

In various embodiments, the ruggedized smartphone/tablet iTap Pedal Case can activate function locations such as audio effect presets by using: (i) a tilting mechanism inside the case as shown in FIG. 14; (ii) a tilting mechanism on the outside of the case as shown in FIG. 15; (iii) inverted pedal buttons as shown in FIG. 16; or (iv) the features of a typical smartphone including using the touch screen and gestures (discussed below).

Tilting Mechanism Inside the Ruggedized Case

FIG. 14 shows an exploded view of a generic ruggedized iTap Pedal Case 1400 with an internal tilting mechanism 1410. In this embodiment, the tilting mechanism 1410 tilts inside the base 1401. Optional spring-loaded pedal buttons 1411 on top of the front protective cover 1404 press indirectly or directly on the corners of the smartphone/tablet 1402 tilting the smartphone/tablet 1402 due to the softness/tiltability of the tilting mechanism 1410 below the smartphone/tablet 1402. The iTap Pedal App registers the tilt using the smartphone/tablet's 1402 tilt sensors.

Tilting Mechanism Outside the Ruggedized Case

FIG. 15 shows an exploded view of a generic ruggedized iTap Pedal Case 1500 with an external tilting mechanism 1512. In this embodiment, the tilting mechanism 1512 tilts outside the base 1501. Therefore, spring-loaded pedal buttons 1511 are not necessary, although may still be used to provide tactile feedback to the user. Thus, the user can simply just tap the corners/edges of the device case 1500 to activate function locations. Again, the iTap Pedal App registers the tilt using the smartphone/tablet's 1502 tilt sensors.

Tilting the Ruggedized Case Using Inverted Pedal Buttons

FIG. 16 shows an exploded view of a generic ruggedized iTap Pedal Case 1600 with inverted pedal buttons 1613. The inverted pedal buttons 1613 are disconnected momentary stomp switches that tilt the device. The iTap Pedal App registers the tilt using the smartphone/tablet's 1602 tilt sensors.

Options

Kickstand

Figure 3C:
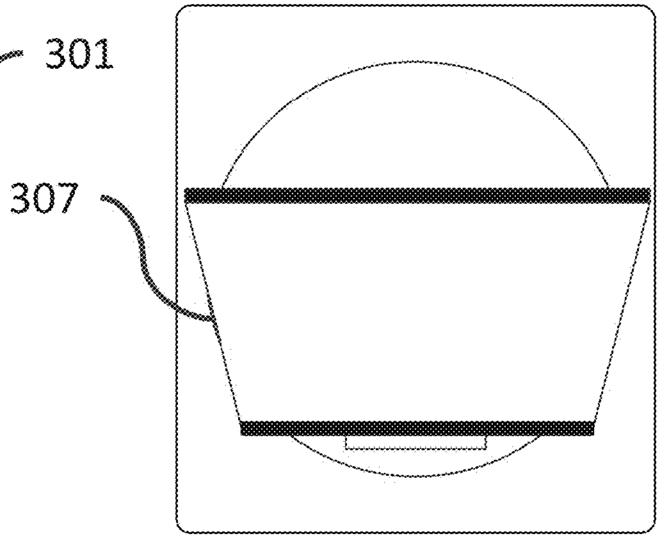
FIG. 3*c* shows a bottom view of a wireless iTap Pedal including a kickstand.

The iTap Pedal 300 can be designed to be used in landscape or portrait mode. The user would have the ability of using the pedal either in landscape mode (placing the pedal horizontally), or in portrait mode (placing the pedal vertically). In the preferred embodiment, as shown in FIG. 3*a*, FIG. 3*c*, and FIG. 4*a*, the iTap Pedal kickstand 307 is rotatable to enable switching between landscape mode and portrait mode. As there are no cables in the embodiment shown in FIG. 3*a* and FIG. 3*c*, such a rotatable kickstand would not have to accommodate or take into account any wires when rotating.

In the embodiment shown in FIG. 4*a* and FIG. 4*b*, to accommodate for a rotatable kickstand such that the cables would not be coming out of the bottom surface of the iTap Pedal 400—making the kickstand angle difficult, the instrument cable jacks could be located at 90° to each other. For example, while in landscape mode, the INPUT would be located on the top surface and the OUTPUT would be located on the right surface. To change to portrait mode, the device would be rotated counterclockwise by 90° such that the INPUT would be located on the left surface and the OUTPUT would be located on the top surface.

In another embodiment, the kickstand can be extended to add surface area to support and stabilize the iTap Pedal to accommodate switching between landscape and portrait modes.

Gestures

In one embodiment, gestures can be used to activate a pedal function. For example, instead of stomping/tapping on a pedal location to change audio effect presets with the forward button 502 and back button 503 shown in FIG. 5, the musician could wave her hand, foot, or instrument over the iTap Pedal. For example, an indirect input sensor may detect aspects of the local environment (e.g. hand or foot gestures made by a user, or the location of a person) and activate one or more aspects of the iTap Pedal in response (e.g. illuminate a display, or activate a 10 second fade out of a song, or activate a 10 second fade out of a first song followed by a 10 second fade in of a second song). An example of an indirect input sensor can be the Infineon Xensive 60 GHz radar system-on-chip using Google Soli which can identify hand gestures made by a user. The indirect input sensor can also be lidar operable to scan a laser beam through an optically transparent portion of the pedal's housing. One or more indirect input sensors can also be an LED or laser based lidar that performs ranging or gesture recognition based on illuminating some or all of the local environment with visible or infrared light.

Synchronization

In one embodiment, the iTap Pedal App graphical user interface is synchronized with the graphical user interface on the iTap Pedal. In another embodiment, the iTap Pedal graphical user interface is synchronized with the graphical user interface on the iTap Pedal App. Any parametric changes made on one graphical user interface of one device is synchronized with the graphical user interface of the other device in real time.

Detachable Covering with Bumpers

As shown in FIG. 3*a*, the transparent protective cover 302 is positioned above the display portion of the touch screen 301. In one embodiment, a second cover (not shown) can be positioned above the protective cover 302. The second cover is a surface that enables the user to position hemi-spherical bumpers such as the 3M 0.75" Platinum Silicone Hemisphere Bumper, Non-Skid Isolation Feet with Adhesive in any position on the surface giving the user both additional foot-tap accuracy and a feedback mechanism. The second cover is transparent and coated with the same or similar material to that used for reusable sticker paper such as silicone, gel, Velcro™, or similar attachable-detachable products or substances.

In one embodiment, the 3M 0.75" Platinum Silicone Hemisphere Bumper, Non-Skid Isolation Feet 305 can be molded into the transparent protective cover 302 or the second cover (not shown) in locations such as the corners.

Waterproof Case

The cases shown in FIG. 14, FIG. 15, and FIG. 16 may be waterproof similar to the Willbox Professional Diving Surfing Swimming Snorkeling Photo Video Waterproof Protective Case. The iTap Pedal shown in FIG. 3*a* and FIG. 4*a* may also be waterproof by using a waterproof case with port protection such as the Punkcase for the iPhone 12 Pro.

Tapping Sequences

As discussed above, the 6-DoF sensor enables a function location to activate more than one function. For example, a single tap can be associated with a first function and a double tap can be associated with a second function. Similarly, the duration of a pedal tap can also be used to activate a function. For example, a quick tap can be associated with a first function and holding down on a pedal location for 1 or 2 seconds can be associated with a second function.

As another example, if the user wants to reset or mute any of the functionality of the iTap Pedal, this can be accomplished by either tapping and holding for several seconds, or double tapping, gesturing, or a combination thereof.

Active or Passive iTap Pedal

In the event that the iTap Pedal 400 as shown in FIG. 4*a* stops working, runs out of batteries, if the musician does not want to use any of the iTap Pedal 400 electronics, or if the musician wants to use an iCable (as disclosed in the iCable Patent as discussed above) either passively or actively, the iTap Pedal 400 may be used passively to cleanly pass the guitar's audio to an amplification or recording system by plugging in a standard audio cable or iCable into the XLR/1/4" combo output jack 409. Buttons (not shown) on the iTap Pedal's graphical user interface (for example graphical user interface 500 of FIG. 5*a*), allows for the ability to choose (not shown) to operate the iTap Pedal 400 as either a controller or an iTap Pedal actively or passively. Thus, the iTap Pedal can be used in the following scenarios: (i) actively, with a passive cable; (ii) actively, with an iCable; (iii) passively, with an active iCable; (iv) passively, with a passive iCable; (v) and actively, with no cable where the guitar signal is wirelessly sent to a wireless receiver in the iTap then wirelessly sent to a wireless receiver plugged into an output device such as an amplifier.1

In one embodiment, a scenario may arise that the iTap Pedal's battery falls below a certain threshold at which point the iTap Pedal can automatically switch to a passive configuration.

Adding audio effects often boosts the volume of an incoming audio signal. Because of this, when an audio effect is suddenly turned off, the audio source signal is often dramatically attenuated. In one embodiment, the iTap Pedal 400 with digital signal processing as shown in FIG. 4*a* (or the iCable as disclosed in the iCable Patent as discussed above) analyzes an incoming audio signal to determine the average (or range) output decibel level (inclusive of audio effects being applied) over the previous several minutes (time set by the user in the iTap Pedal App) and will use that audio level as a foundation/range to keep the audio level played through the iTap Pedal 400 at that level/range even if the iTap Pedal 400 loses power or is switched from being used actively to passively. This feature thus allows a consistent audio output decibel level when the iTap Pedal is used either actively or passively. Alternatively, the user can also set a maximum or minimum output decibel level in the iTap App.

In one embodiment, in the event that for any reason the user needs to use algorithms, loops, songs, or pre-configured controllers stored on an intelligent cable such as iCable (as disclosed in the iCable Patent as discussed above), the iTap Pedal can be used to access the memory of the iCable via a memory management system allowing both the iTap Pedal and iCable to be used at the same time. In this situation, the iCable would not be actively processing audio as the audio processing would be occurring in the iTap Pedal. Additionally, the iCable wouldn't be passive because it would exist to provide access to the iCable memory. Therefore, the iCable would need to be in a third mode where it would just provide access to the iCable memory. This would operate similar to the Media Transfer Protocol mode in Google Android devices. Additional algorithms, loops, songs, and controls would be stored in the iCable memory and would be transferred as needed to the iTap Pedal's RAM (an independent device or part of the iTap Pedal's microprocessor or digital signal processor).

Intelligent Cable Detection

In one embodiment, when a passive or active iCable (as disclosed in the iCable Patent as discussed above) or a standard passive instrument cable is plugged into XLR/1/4" combo input jack 408 (as shown in FIG. 4*a*), in the preferred embodiment, the iTap Pedal's microprocessor (or similar device) determines which type of cable is plugged in and makes the determination through software means (using, for example, technology disclosed in U.S. Pat. No. 7,356,433 issued to Tsai, incorporated by reference herein) or through hardware means (using, for example, technology disclosed in European Patent No. 3171480B1 issued to Zhang et al., incorporated by reference herein). If the hardware or software determines that an iCable is plugged in, the iTap Pedal display prompts the user to select whether the iCable should be used passively, actively, or as additional memory for the iTap Pedal.

OTHER USES

The iTap Pedal can also be used in other settings such as a surgical/medical or other mechanical setting where one's hands are otherwise occupied and one would like to use a wireless foot controller. For example, a surgeon may use a pedal to control the flow of a liquid or gas, adjust the temperature of a medical instrument attached to a machine, control drill speed, control a camera's movements or focus, control a robotic device, turn on/off any electrical device, or adjust parameters for an electrical device.

In the event of inconsistent usages between this document and those documents so incorporated by reference, the usage in the incorporated reference(s) should be considered supplementary to that of this document; for irreconcilable inconsistencies, the usage in this document controls.

We claim:

1. A foot pedal, the foot pedal comprising:

a base, the base configured to receive a smartphone or a tablet;

a cover, the cover configured to protect a display of the smartphone or tablet while the smartphone or the tablet is inserted into the base, the cover configured to receive input from a foot;

wherein the display is configured to display a graphical user interface of an application on the smartphone or the tablet, the graphical user interface comprising a plurality of function locations, the plurality of function locations comprising a first function location, the first function location associated with a first function, the first function controlling one or more of an audio effect, a loop, and a song; and a tilt mechanism, the tilt mechanism configured to allow physical tilting of the smartphone or tablet within the base, wherein a tilting of the smartphone or tablet enables a selection, in the application on the display of the smartphone or the tablet, of the first function when the smartphone or the tablet is tilted by the foot towards the first function location.

2. The foot pedal of claim 1, wherein the first function further controls one or more of a first audio effect preset, a first looper, a first loop, or a first controller.

3. The foot pedal of claim 2, wherein the first function comprises one or more adjustable parameters.

4. The foot pedal of claim 3, wherein the display is a touch screen, and wherein at least one of the one or more adjustable parameters are adjusted on the touch screen.

5. The foot pedal of claim 3, wherein at least one of the one or more adjustable parameters are adjusted on the application.

6. The foot pedal of claim 2, wherein the first function location is associated with a second function, wherein the second function controls one or more of a second audio effect, a second audio effect preset, a second looper, a second loop, and a second song, or a second controller, wherein the selection of the first function is activated by a first selection process, and wherein the selection of the second function is activated by a second selection process, wherein both the first selection process and the second selection process are activated by one or more of a tapping sequence and a gesture.

7. The foot pedal of claim 2, wherein the foot pedal is configured to connect to an intelligent cable, and wherein the foot pedal is configured to detect a connection to the intelligent cable.

8. The foot pedal of claim 1, wherein the tilt mechanism is one or more of:
- a plurality of active inverted pedal buttons;
- a plurality of inactive inverted pedal buttons;
- a plurality of springs;
- a tiltable pad;
- a tiltable cylinder; and
- a spherical sectioned pivot.

9. The foot pedal of claim 1, wherein selection of the first function controls a movement of a mechanical device; or controls a parameter of an electronic device.

10. The foot pedal of claim 1 further comprising one or more of:
- a microphone;
- a microphone input;
- a proximity sensor;
- an ambient light sensor;
- a tilt sensor;
- an accelerometer;
- a gyroscope; and
- an indirect input sensor.

11. The foot pedal of claim 1, wherein the base and cover are a ruggedized case.

12. The foot pedal of claim 1, wherein the display is a touch screen.

13. The foot pedal of claim 1, wherein the cover is a clear protective cover for the smartphone or the tablet.

14. The foot pedal of claim 1, wherein the graphical user interface is synchronized with the application.

15. A musical effect controller comprising:
- a display on a smartphone or tablet, the display configured to display a graphical user interface of an application on the smartphone or the tablet, the graphical user interface comprising a plurality of function locations, the plurality of function locations comprising a first function location, the first function location associated with a first function, the first function controlling one or more of an audio effect, a loop, and a song; and
- a tilt mechanism, the tilt mechanism configured to allow tilting of the display when touched by a foot, the tilt mechanism further configured to enable the selection of the first function in the application on the display of the smartphone or the tablet when the smartphone or the tablet is tilted by the foot towards the first function location.

16. The controller of claim 15, wherein the first function further controls one or more of a first audio effect preset, a first looper, a first loop, or a first controller.

17. The controller of claim 16, wherein the first function comprises one or more adjustable parameters.

18. The controller of claim 17, wherein the display is a touch screen, and wherein at least one of the one or more adjustable parameters are adjusted on the touch screen.

19. The controller of claim 17, wherein at least one of the one or more adjustable parameters are adjusted on the application.

20. The controller of claim 16, wherein the first function location is associated with a second function, wherein the second function controls one or more of a second audio effect, a second audio effect preset, a second looper, a second loop, and a second song, or a second controller, wherein the selection of the first function is activated by a first selection process, and wherein the selection of the second function is activated by a second selection process, wherein both the first selection process and the second selection process are activated by one or more of a tapping sequence and a gesture.

21. The controller of claim 16, wherein the controller is configured to connect to an intelligent cable, and wherein the controller is configured to detect a connection to the intelligent cable.

22. The controller of claim 15, wherein the tilt mechanism is one or more of:
- a plurality of active inverted pedal buttons;
- a plurality of inactive inverted pedal buttons;
- a plurality of springs;
- a tiltable pad;
- a tiltable cylinder; and
- a spherical sectioned pivot.

23. The controller of claim 15, wherein selection of the first function controls a movement of a mechanical device; or controls a parameter of an electronic device.

24. The controller of claim 15, further comprising one or more of:
- a proximity sensor;
- an ambient light sensor;
- a tilt sensor;
- an accelerometer;
- a gyroscope; and
- an indirect input sensor.

25. The controller of claim 15, wherein the controller includes a ruggedized case configured to hold the smartphone or the tablet.

26. The controller of claim 15, wherein the graphical user interface is synchronized with the application.

* * * * *